(12) United States Patent
Cams et al.

(10) Patent No.: US 11,841,543 B2
(45) Date of Patent: Dec. 12, 2023

(54) CABLE FIXATION ASSEMBLY WITH IMPROVED STRENGTH MEMBER YARN ANCHORING AND METHOD OF ANCHORING CABLE STRENGTH MEMBER YARN

(71) Applicant: COMMSCOPE TECHNOLOGIES LLC, Hickory, NC (US)

(72) Inventors: Eddy Luc Cams, Bilzen (BE); Johan Geens, Bunsbeek (BE); Matthew Campsteyn, Hoeselt (BE); Roel Modest Willy Bryon, Aarschot (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/605,454

(22) PCT Filed: Apr. 22, 2020

(86) PCT No.: PCT/US2020/029356
§ 371 (c)(1),
(2) Date: Oct. 21, 2021

(87) PCT Pub. No.: WO2020/219571
PCT Pub. Date: Oct. 29, 2020

(65) Prior Publication Data
US 2022/0196959 A1 Jun. 23, 2022

Related U.S. Application Data

(60) Provisional application No. 62/951,229, filed on Dec. 20, 2019, provisional application No. 62/836,974, filed on Apr. 22, 2019.

(51) Int. Cl.
*G02B 6/44* (2006.01)
(52) U.S. Cl.
CPC ......... *G02B 6/4471* (2013.01); *G02B 6/4432* (2013.01)
(58) Field of Classification Search
CPC .......................... G02B 6/4432; G02B 6/4471
See application file for complete search history.

(56) References Cited

U.S. PATENT DOCUMENTS 5,835,660 A  11/1998  Jung et al.
6,504,986 B1  1/2003  Wambeke et al.
(Continued)

FOREIGN PATENT DOCUMENTS

CN    1169543 A    1/1998
CN    107111092 A    8/2017
(Continued)

OTHER PUBLICATIONS

Extended European Search Report for Application No. 20795139.3 dated Jan. 2, 2023.
(Continued)

*Primary Examiner* — Sung H Pak
(74) *Attorney, Agent, or Firm* — Merchant & Gould P.C.

(57) ABSTRACT

Devices, assemblies and methods for anchoring and tightening strength member yarn of a telecommunications cable. The strength member yarn is routed through channels defined in a cable fixation body and pulled into one or more recesses positioned between one of the channels and the cable jacket to tightly anchor the strength member yarn.

22 Claims, 30 Drawing Sheets

(56) References Cited

U.S. PATENT DOCUMENTS

| | | | |
|---|---|---|---|
| 7,254,307 B2 | 8/2007 | Xin | |
| 8,538,227 B2 * | 9/2013 | Cowen | G02B 6/4471 |
| | | | 385/136 |
| 8,903,216 B2 | 12/2014 | Thompson et al. | |
| 10,379,310 B2 * | 8/2019 | Aznag | G02B 6/46 |
| 11,422,327 B2 | 8/2022 | Geens et al. | |
| 2006/0228087 A1 | 10/2006 | Bayazit et al. | |
| 2007/0047897 A1 | 3/2007 | Cooke et al. | |
| 2008/0236861 A1 | 10/2008 | Bartholoma et al. | |
| 2009/0211219 A1 | 8/2009 | Buchmiller | |
| 2010/0054689 A1 | 3/2010 | Mullaney et al. | |
| 2010/0092147 A1 | 4/2010 | Desard et al. | |
| 2010/0183270 A1 | 7/2010 | Davis et al. | |
| 2012/0230646 A1 | 9/2012 | Thompson et al. | |
| 2012/0288248 A1 | 11/2012 | Chapa Ramirez et al. | |
| 2013/0209052 A1 | 8/2013 | Subash et al. | |
| 2014/0079366 A1 | 3/2014 | Rodriguez et al. | |
| 2015/0378106 A1 * | 12/2015 | Allen | G02B 6/4471 |
| | | | 385/137 |
| 2016/0134092 A1 | 5/2016 | Bonvallat et al. | |
| 2021/0208356 A1 | 7/2021 | Collart et al. | |
| 2022/0120975 A1 | 4/2022 | Geens et al. | |
| 2023/0129717 A1 | 4/2023 | Coenegracht et al. | |

FOREIGN PATENT DOCUMENTS

| | | |
|---|---|---|
| EP | 1 020 750 A2 | 7/2000 |
| EP | 2 148 231 A1 | 1/2010 |
| EP | 2 647 095 B1 | 8/2014 |
| EP | 3 032 304 B1 | 11/2018 |
| JP | H09-304631 A | 11/1997 |
| KR | 10-0952825 B1 | 4/2010 |
| KR | 10-2017-0009550 A | 1/2017 |
| WO | 00/75704 A1 | 12/2000 |
| WO | 02/073281 A1 | 9/2002 |
| WO | 02/097505 A1 | 12/2002 |
| WO | 2009/040566 A1 | 4/2009 |
| WO | 2009/106874 A1 | 9/2009 |
| WO | 2012/121955 A1 | 9/2012 |
| WO | 2013/037746 A1 | 3/2013 |
| WO | 2013/149857 A1 | 10/2013 |
| WO | 2013/149922 A1 | 10/2013 |
| WO | 2013/174992 A1 | 11/2013 |
| WO | 2014/173439 A1 | 10/2014 |
| WO | 2015/028619 A2 | 3/2015 |
| WO | 2016/000901 A1 | 1/2016 |
| WO | 2017/114936 A1 | 7/2017 |
| WO | 2018/154125 A1 | 8/2018 |
| WO | 2018/192917 A1 | 10/2018 |
| WO | 2019/034613 A1 | 2/2019 |
| WO | 2019/072782 A1 | 4/2019 |
| WO | 2019/072852 A1 | 4/2019 |
| WO | 2019/160995 A1 | 8/2019 |
| WO | 2019/241502 A1 | 12/2019 |
| WO | 2020/104395 A1 | 5/2020 |
| WO | 2020/154418 A1 | 7/2020 |
| WO | 2020/212365 A1 | 10/2020 |
| WO | 2021/011386 A1 | 1/2021 |
| WO | 2021/055282 A1 | 3/2021 |
| WO | 2021/055285 A1 | 3/2021 |
| WO | 2021/055356 A1 | 3/2021 |
| WO | 2021/163340 A1 | 8/2021 |

OTHER PUBLICATIONS

International Search Report and Written Opinion of the International Searching Authority for International Patent Application No. PCT/US2020/029356 dated Aug. 10, 2020, 9 pages.

ARS Cable Anchor Bracket, Prysmian Group, AC001(8): 1-2 (Apr. 2012).

FIST-GB2 Installation Instruction, FIST-Generic Box, Tyco Electronics Raychem NV, 1-28 (2001).

\* cited by examiner

CABLE FIXATION ASSEMBLY WITH IMPROVED STRENGTH MEMBER YARN ANCHORING AND METHOD OF ANCHORING CABLE STRENGTH MEMBER YARN

CROSS-REFERENCE TO RELATED APPLICATIONS

This application is a National Stage Application of PCT/US2020/029356, filed on Apr. 22, 2020, which claims the benefit of U.S. Patent Application Ser. No. 62/836,974, filed on Apr. 22, 2019, and claims the benefit of U.S. Patent Application Ser. No. 62/951,229, filed on Dec. 20, 2019, the disclosures of which are incorporated herein by reference in their entireties. To the extent appropriate, a claim of priority is made to each of the above disclosed applications.

TECHNICAL FIELD

The present disclosure relates to fixing a portion of a telecommunications cable. In some examples, the telecommunications cable is fixed within an interior volume of a telecommunications closure.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

In certain applications, the enclosure/housing is water and contaminant (e.g., dust) proof or water-resistant. In particular, water, moisture, cleaning fluids, dust, etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. To accommodate cables entering the enclosure through ports in the enclosure wall, sealing members positioned at the port locations of the enclosure can define cable passages such that the sealing blocks form seals around the cables.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing the optical fibers held by the cable to be managed within the closure. One or more of these cable components may be fixed in place using a cable fixation assembly.

Fixing cables in telecommunications closures can be important to minimize damage to, or over-bending, of the exposed fibers. The contents of international PCT Patent Application Publication No. WO 2013/037746 are hereby incorporated by reference in their entirety.

SUMMARY

In general terms, the present disclosure is directed to improvements in the fixation of cables. More particularly, the present disclosure is directed to improvements in the fixation relative to a telecommunications closure of cable strength member yarn of a telecommunications cable. Some telecommunications cables include one or more optical fibers held within a protective buffer tube. Strength member yarn, e.g., aramid yarn, is positioned around the buffer tube in between the buffer tube and an outer protective jacket of the cable. It will be appreciated that fixation principles of the present disclosure can apply to cable fixation to structures other than closures. It will be appreciated that fixation principles of the present disclosure can apply to cables of different configurations, e.g., cables with or without buffer tubes, and cables with or without additional components, such as conductive shields. In some examples, the cable to be fixed has simply an outer jacket housing, one or more signal conductors (e.g., optical fibers or electrical conductors) and a fibrous or yarn-like material within the outer jacket. Such fibrous material is often incorporated into cables to add strength to the cable while still permitting flexing or bending of the cable. In some examples, the fibrous material is, or includes, aramid yarn.

When fixing such a telecommunications cable, it can be advantageous to anchor the fibrous strength member material. Anchoring the fibrous strength member material can, e.g., minimize undesirable stresses on or shifting of the exposed optical fiber(s) (or other signal conduits). The exposed optical fibers are delicate and are often managed in ways (e.g., splicing, splitting) that are sensitive to external loads. For example, external forces on the optical fibers can cause breakage or bending of an optical fiber beyond its minimum bend radius, which can result in deterioration of signal transmission. In addition, if not suitably anchored, the threads of the fibrous strength member material can have a tendency to separate and spread out, which can interfere with adjacent cables and fixation assemblies. For example, stray strength member threads from one cable can become undesirably attached to an adjacent cable or cable fixation assembly. Aspects of the present disclosure provide for improved anchoring of strength member threads that minimizes movement and/or separation of the threads.

In accordance with certain aspects of the present disclosure, a cable fixation assembly comprises a body extending along a longitudinal axis between a first end and a second end and along a transverse axis between a first side and a second side, the transverse axis being perpendicular to the longitudinal axis, the body defining: a cable mounting region; a transversely extending through hole through the body; a longitudinally extending channel leading to the through hole; and a recess adjacent the through hole and positioned between the through hole and the cable mounting region.

In accordance with further aspects of the present disclosure, a method comprises: a) providing a cable, the cable defining a central longitudinal axis and including an optical fiber, a strength member, and an outer jacket surrounding the central axis, a portion of the optical fiber and a portion of the strength member; b) providing a cable fixation body extending along a longitudinal axis between a first end and a second end and along a transverse axis between a first side and a second side, the transverse axis being perpendicular to the longitudinal axis, the body defining: a cable mounting region; a transversely extending through hole through the body; a longitudinally extending channel leading to the through hole; and a recess adjacent the through hole and positioned between the through hole and the cable mounting region; c) feeding a tie through the through hole; d) holding a portion of the outer jacket to the cable mounting region; e) placing a first portion of an exposed length of the strength member in the channel; and f) looping the tie around the cable and a second portion of the exposed length of the strength member and tightening the tie such that the second portion is pulled into the recess and towards the outer jacket, the second portion extending from an end of the first portion.

In accordance with further aspects of the present disclosure, a method comprises: a) providing a cable, the cable defining a central longitudinal axis and including an optical fiber, a strength member, and an outer jacket surrounding the central axis, a portion of the optical fiber and a portion of the strength member; b) providing a cable fixation body extending along a longitudinal axis between a first end and a second end and along a transverse axis between a first side and a second side, the transverse axis being perpendicular to the longitudinal axis, the body defining: a cable mounting region; first and second transversely extending through holes through the body; a longitudinally extending first channel leading to one of the through holes; a first recess adjacent the second through hole and positioned between the second through hole and the cable mounting region; c) feeding a first tie through the first through hole; d) feeding a second tie through the second through hole; e) holding a portion of the outer jacket to the cable mounting region; f) placing a first portion of an exposed length of the strength member in the first channel; g) looping the first tie around the cable and a second portion of the exposed length of the strength member and tightening the first tie; h) after the step g), overlapping an exterior surface of the first tie with a third portion of the exposed length of the strength member; and i) looping the second tie around the cable and a fourth portion of the exposed length of the strength member and tightening the second tie such that the fourth portion is pulled into the first recess and towards the outer jacket, the fourth portion extending from a first end of the first portion. In some examples the body defines a second recess adjacent the first through hole and positioned between the first through hole and the cable mounting region, wherein the tightening of the first tie is such that the second portion of the exposed length of the strength member is pulled into the first recess and towards the outer jacket.

In accordance with still further aspects of the present disclosure, a method comprises: a) providing a cable, the cable defining a central longitudinal axis and including an optical fiber, a strength member, and an outer jacket surrounding the central axis, a portion of the optical fiber and a portion of the strength member; b) providing a cable fixation body extending along a longitudinal axis between a first end and a second end and along a transverse axis between a first side and a second side, the transverse axis being perpendicular to the longitudinal axis, the body defining: a cable mounting region; first and second transversely extending through holes through the body; a longitudinally extending first channel leading to one of the through holes; a recess adjacent the second through hole and positioned between the second through hole and the cable mounting region; and an arcuate second channel leading from the first side of the body to the first channel and defining a strength member routing path lying in a reference plane perpendicular to the longitudinal axis; c) feeding a first tie through the first through hole; d) feeding a second tie through the second through hole; e) holding a portion of the outer jacket to the cable mounting region; f) routing a first portion of an exposed length of the strength member along the routing path from the first side of the body to the first channel; g) placing a second portion of the exposed length of the strength member in the first channel, the second portion extending from an end of the first portion; h) looping the first tie around the cable and a third portion of the exposed length of the strength member and tightening the first tie; i) after the step h), overlapping an exterior surface of the first tie with a fourth portion of the exposed length of the strength member; and j) looping the second tie around the cable and a fifth portion of the exposed length of the strength member and tightening the second tie such that the fifth portion is pulled into the recess and towards the outer jacket, the fifth portion extending from an end of the second portion.

In accordance with further aspects of the present disclosure, a cable fixation assembly, comprises: a body extending along a longitudinal axis between a first end and a second end and along a transverse axis between a first side and a second side, the transverse axis being perpendicular to the longitudinal axis, the body defining: a cable mounting region; and a channel defining a strength member yarn routing path having a first portion at the second end of the body extending parallel to the transverse axis and a second portion extending perpendicular to both the longitudinal axis and the transverse axis.

In accordance with further aspects of the present disclosure, cable fixation assembly, comprises: a body extending along a longitudinal axis between a first end and a second end and along a transverse axis between a first side and a second side, the transverse axis being perpendicular to the longitudinal axis, the body defining: a cable mounting region; a longitudinally extending first channel; and a second channel leading to the first channel, the second channel being open and accessible at the second end of the body, wherein the first and second channels define a strength member yarn routing path.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
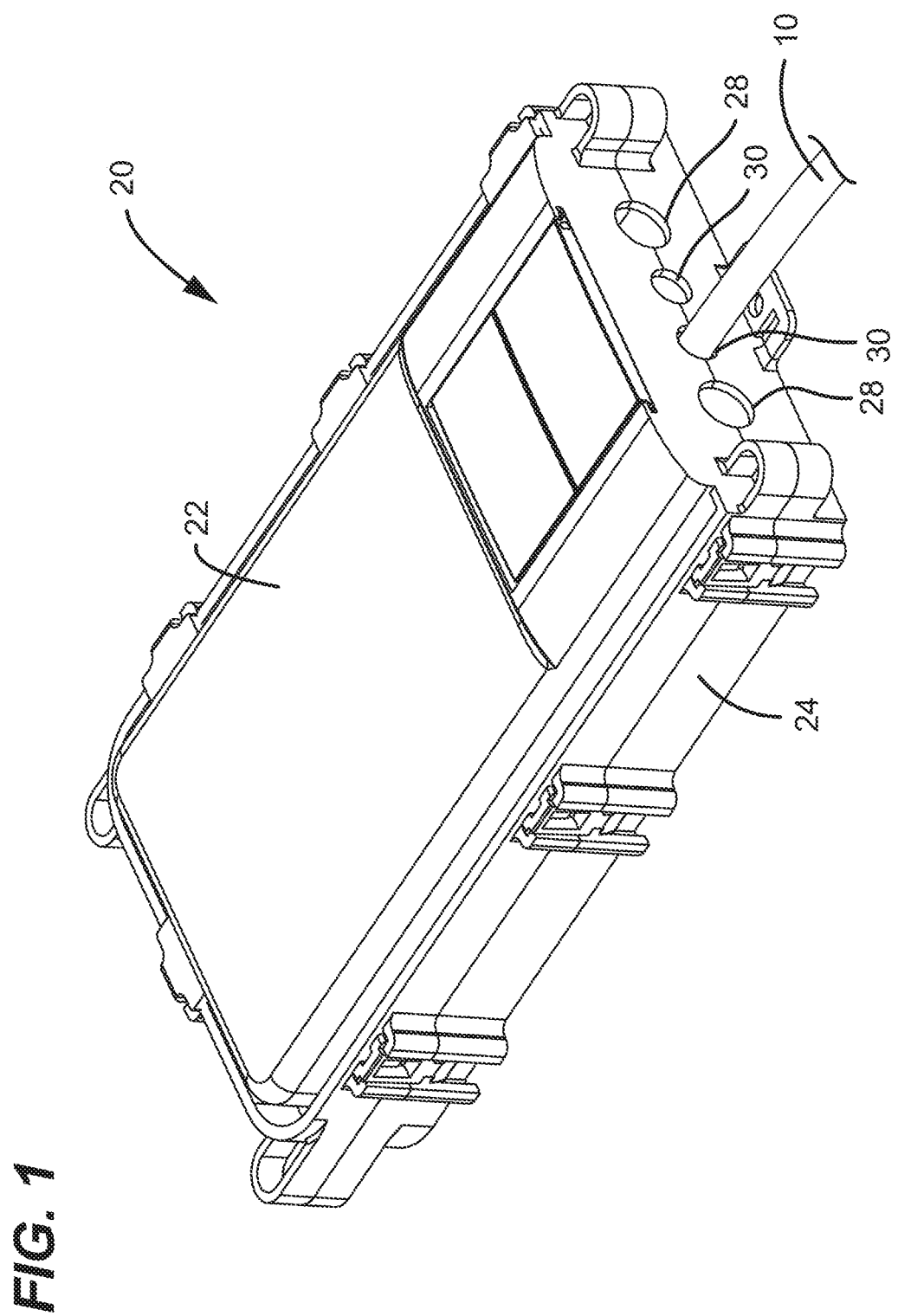
FIG. 1 is a perspective view of an example telecommunications closure and cable in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
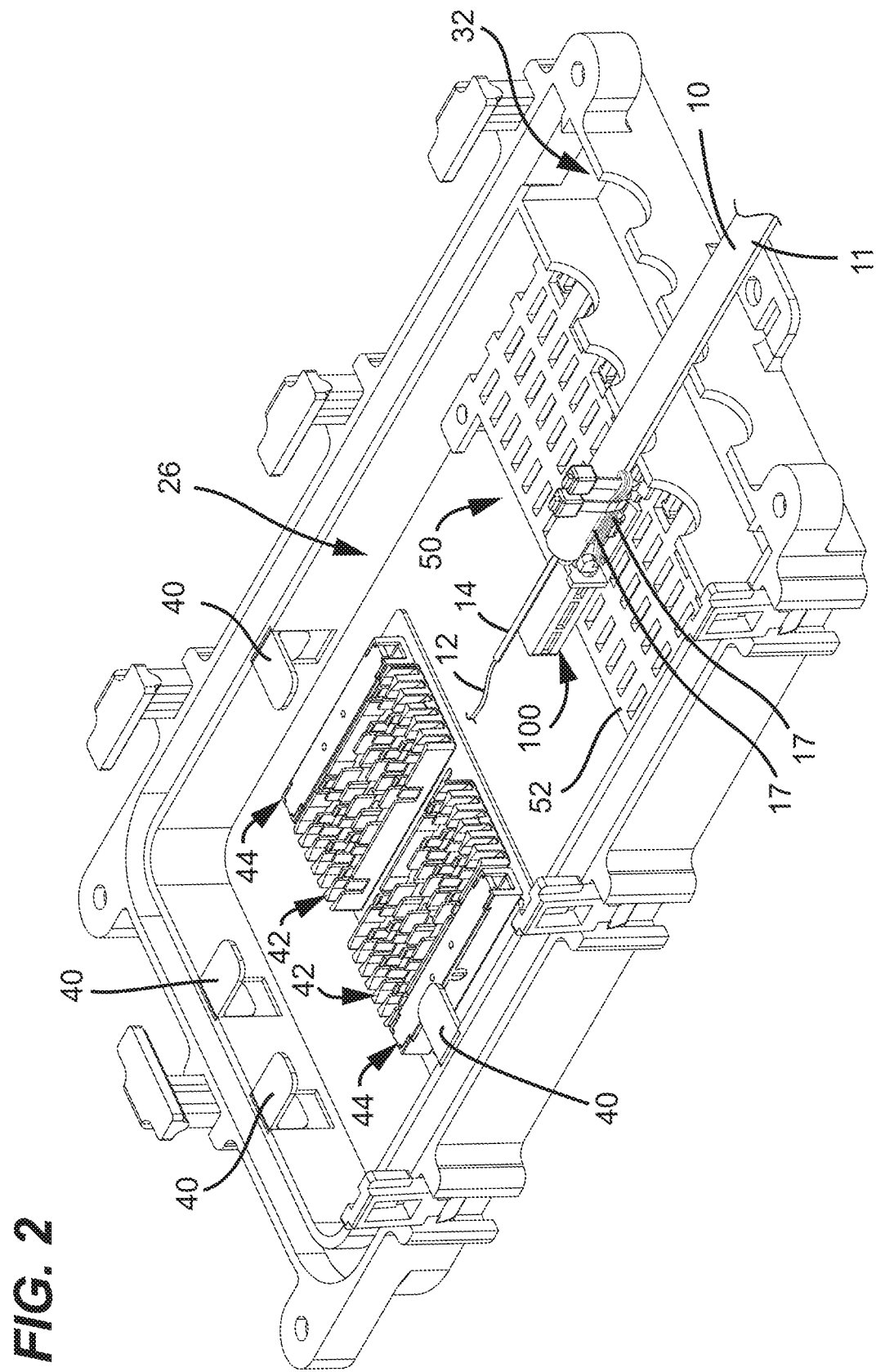
FIG. 2 is a perspective view of a portion of the closure of FIG. 1, the closure being in an open configuration, and showing a cable fixation assembly in accordance with the present disclosure.

Referring to FIGS. 1-2, an example telecommunications closure 20 is depicted. The closure includes housing pieces 22 and 24 that cooperate to create a sealed and re-enterable closure volume 26 where optical and/or electrical fibers carried into the closure volume by one or more cables can be managed. An example cable 10 is schematically shown. The cable 10 is a drop cable that passes through a drop cable port 30 defined by the housing pieces 22 and 24. The cable 10 includes an outer jacket 11 that is secured to a cable fixation unit 100 within the closure volume 26. The feeder cable ports 28 and drop cable port 30 are sealable, e.g., with one or more seal blocks (not shown) adapted to sealingly receive the cables and placed in a seal block holder 32 defined by the closure housing.

An optical fiber 12 of the drop cable 10 is protected by a buffer tube 14 positioned within the outer jacket 11. An end portion of the buffer tube 14 is stripped to expose the optical fiber 12. The optical fiber 12 can be managed within the closure volume 26 in a number of ways, such as by splitting the optical fiber, splicing the optical fiber, storing lengths of the optical fiber, etc. Fiber management components are positioned within the closure volume 26 to aid in managing the optical fiber 12. Such fiber management components include, for example, fiber loop retainer tabs 40, splice body holders 42, and splitter holders 44. In this way the closure 20 can serve as a distribution node of a telecommunications network, e.g., with optical and/or electrical signals being transmitted between a provider side (e.g., a feeder cable) and a subscribers side (e.g., drop cables).

To further protect the optical fibers as they are routed and managed within the closure volume 26 and to help maintain the seal where the cables enter the closure, portions of the cables are fixed to the interior of the closure housing using a cable fixation assembly 50 that is mounted within the closure volume 26. The assembly 50 includes one or more slotted base plates 52 to which one or more cable fixation units are mounted. In this example, a cable fixation unit 100 is mounted to a base plate 52. Fixing of the cables in this way helps transfer lateral or axial loads on the cables to the closure housing rather than to the optical fibers themselves, and also minimizes shifting of the cables that could compromise the closure seal. For example, a spliced optical fiber is highly sensitive to external force, and a force that causes such fiber to shift can damage the splice, or otherwise decrease the fiber's optical performance, e.g., by decreasing its bend radius.

Additional cable fixation units can be mounted to the base plate 52 for fixing additional cables entering the closure. As cables are fixed near one another, it can be important to keep the components of one cable being fixed isolated from the components of another cable being fixed. For example, some cables, such as the drop cable 10, include a fibrous strength member 17 (e.g., aramid yarn) held by the outer jacket 11. The strength member 17 is cut and fixed to the cable fixation unit 100. Over time, if the anchoring of the strength member 17 is not sufficiently tight (e.g., there is some slack in the strength member), the threads of the strength member can spread apart, and disadvantageously interfere with fixing of other cables nearby.

Figure 3:
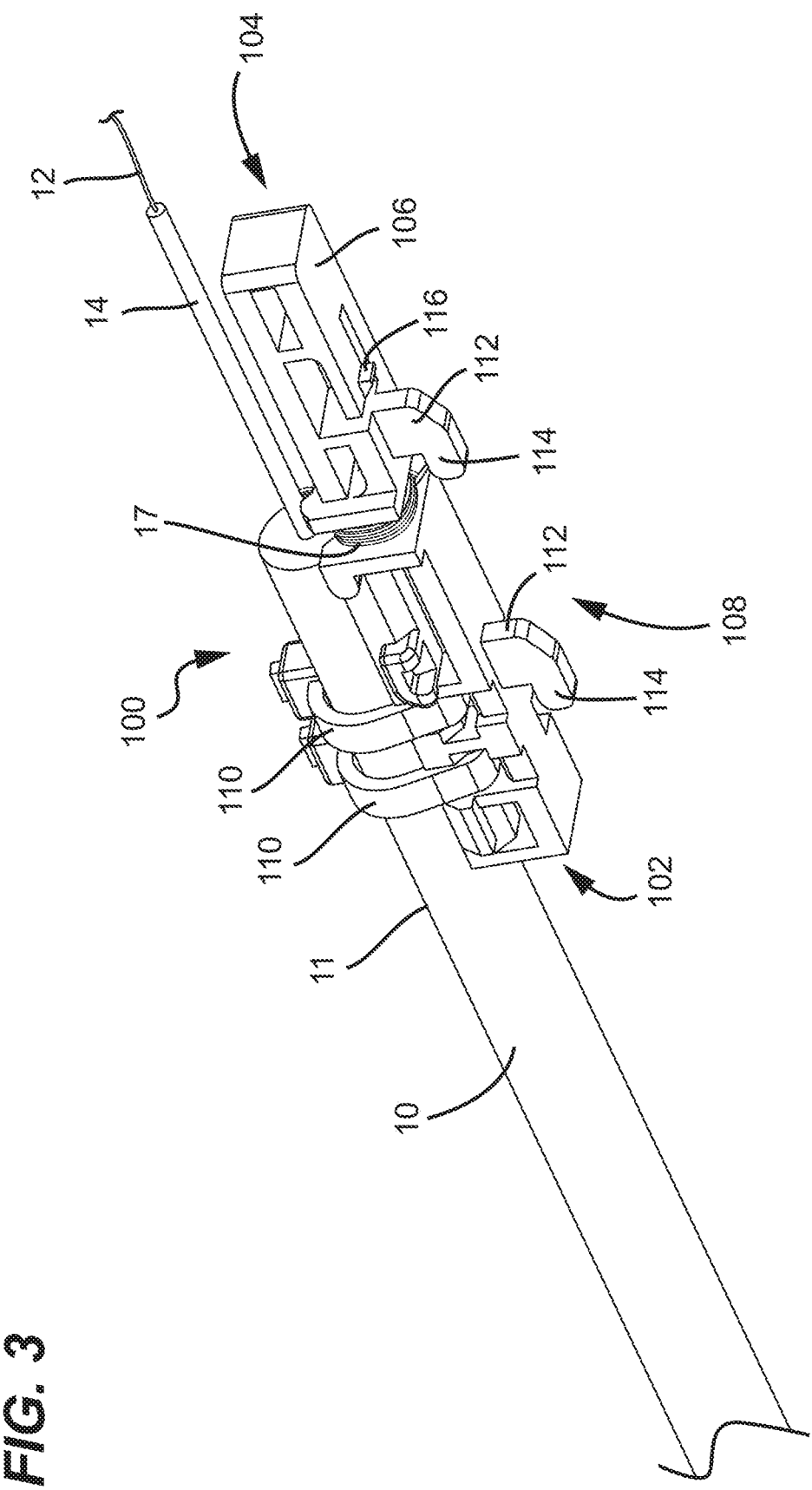
FIG. 3 is a perspective view of a portion of the cable fixation assembly of FIG. 2.
Figure 4:
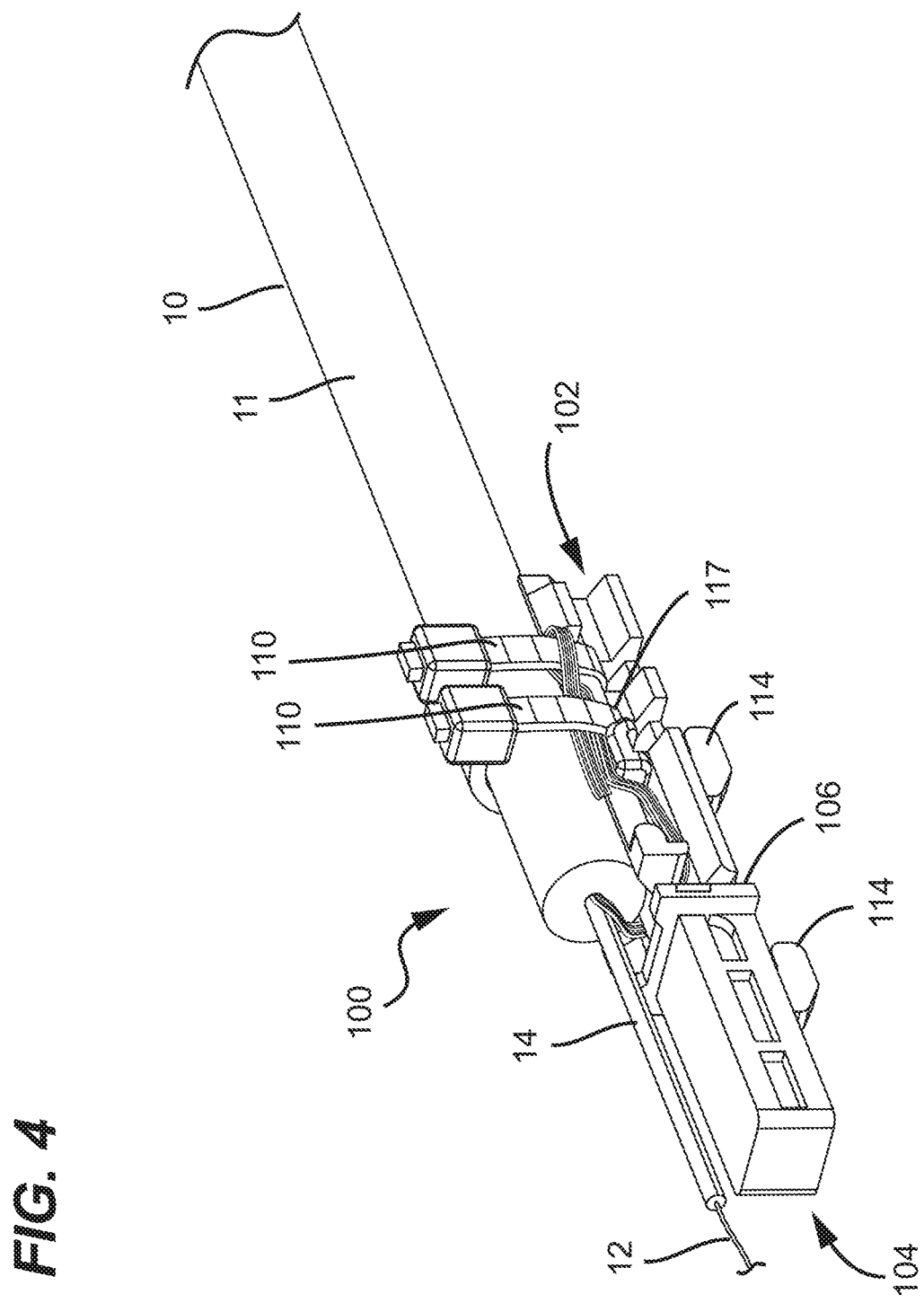
FIG. 4 is a further perspective view of the portion of the cable fixation assembly of FIG. 3.
Figure 5:
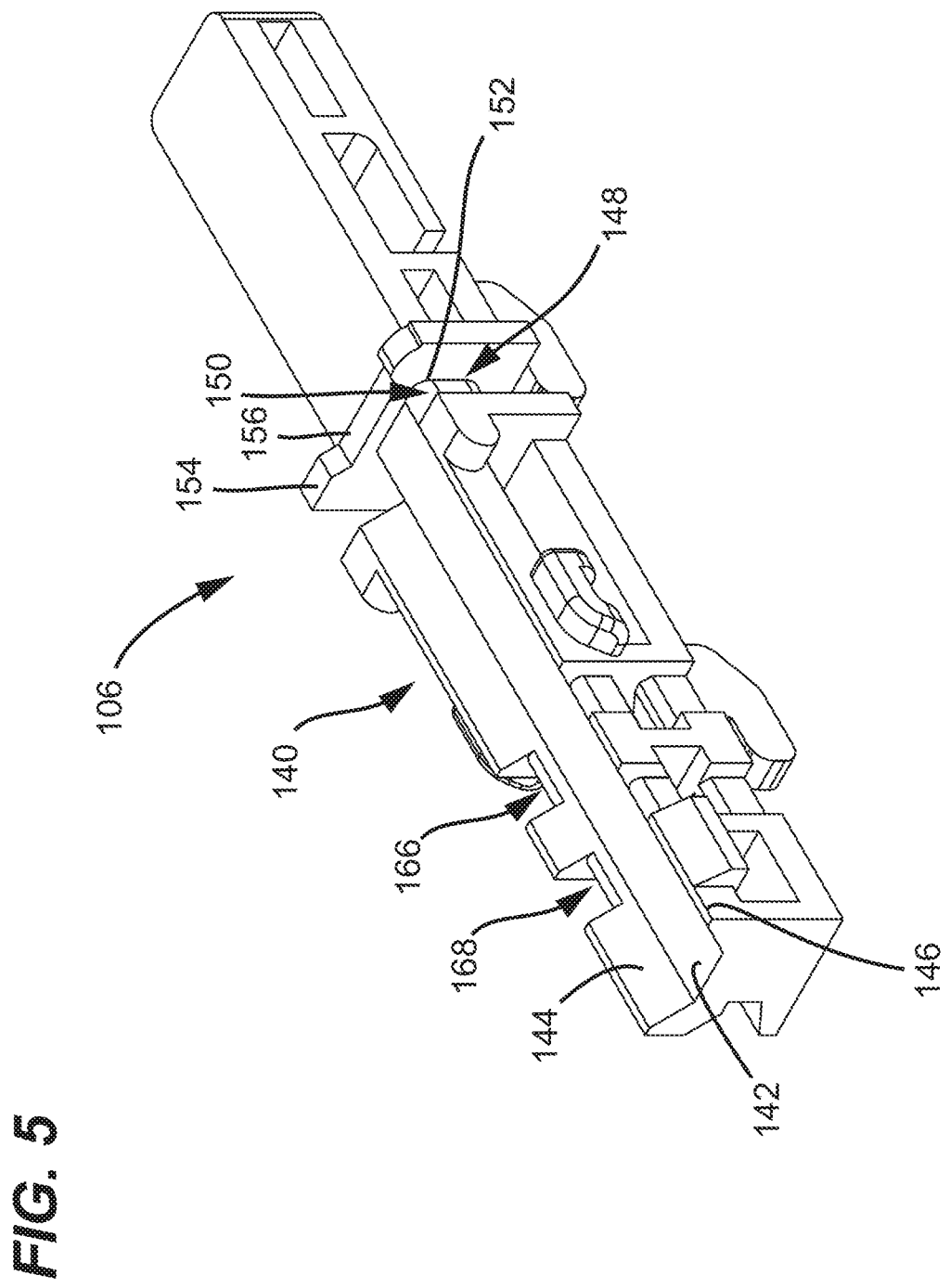
FIG. 5 is a perspective of the cable fixation body of the cable fixation assembly of FIG. 2.
Figure 6:
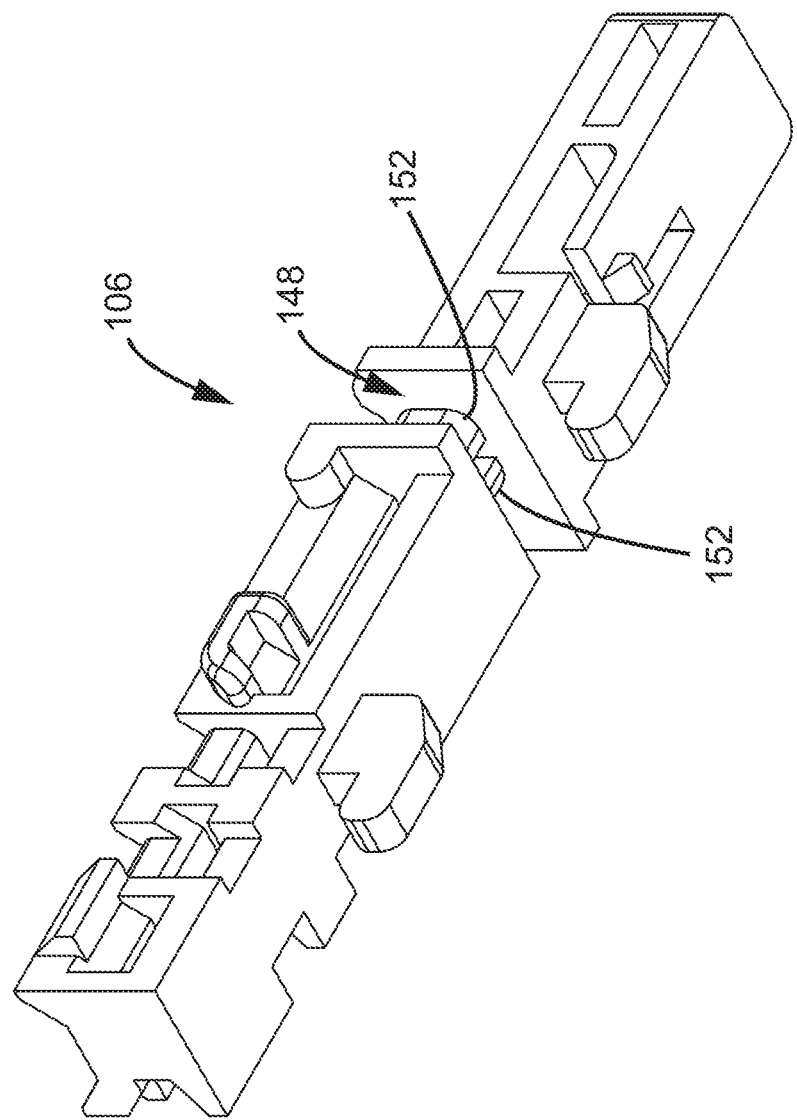
FIG. 6 is a further perspective view of the cable fixation body of FIG. 5.
Figure 7:
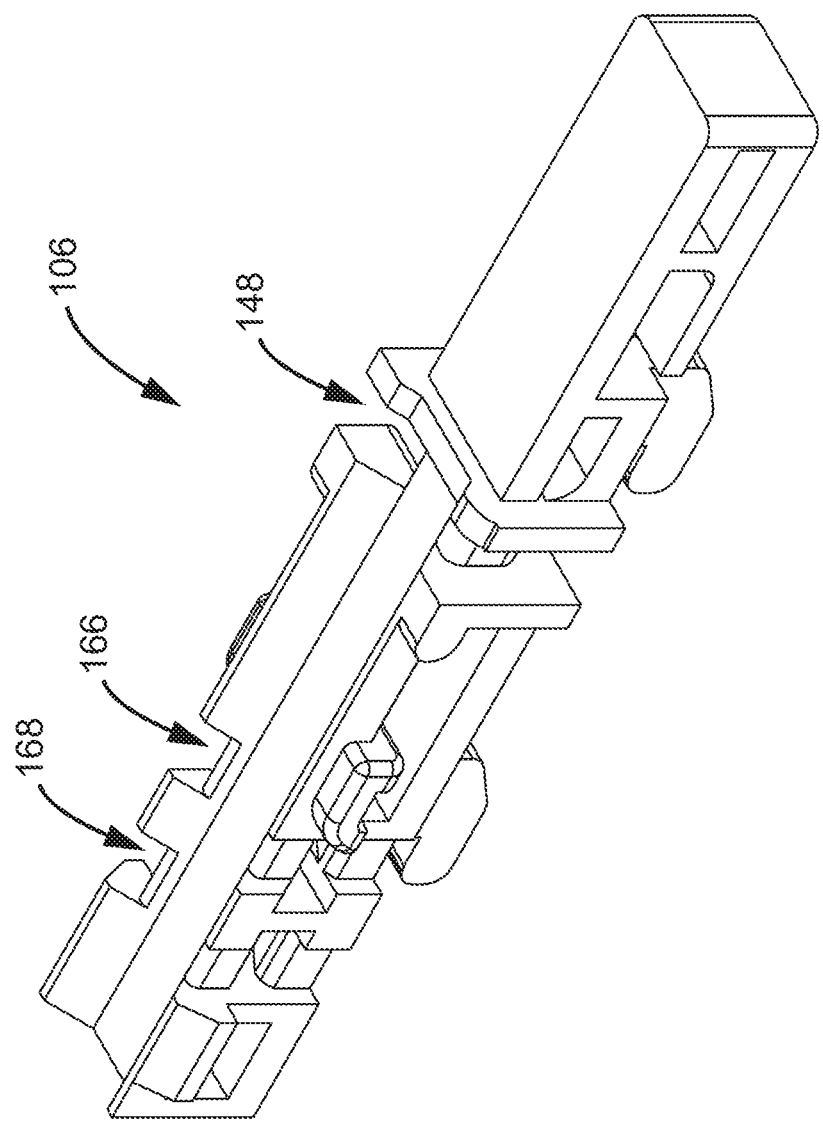
FIG. 7 is a further perspective view of the cable fixation body of FIG. 5.
Figure 8:
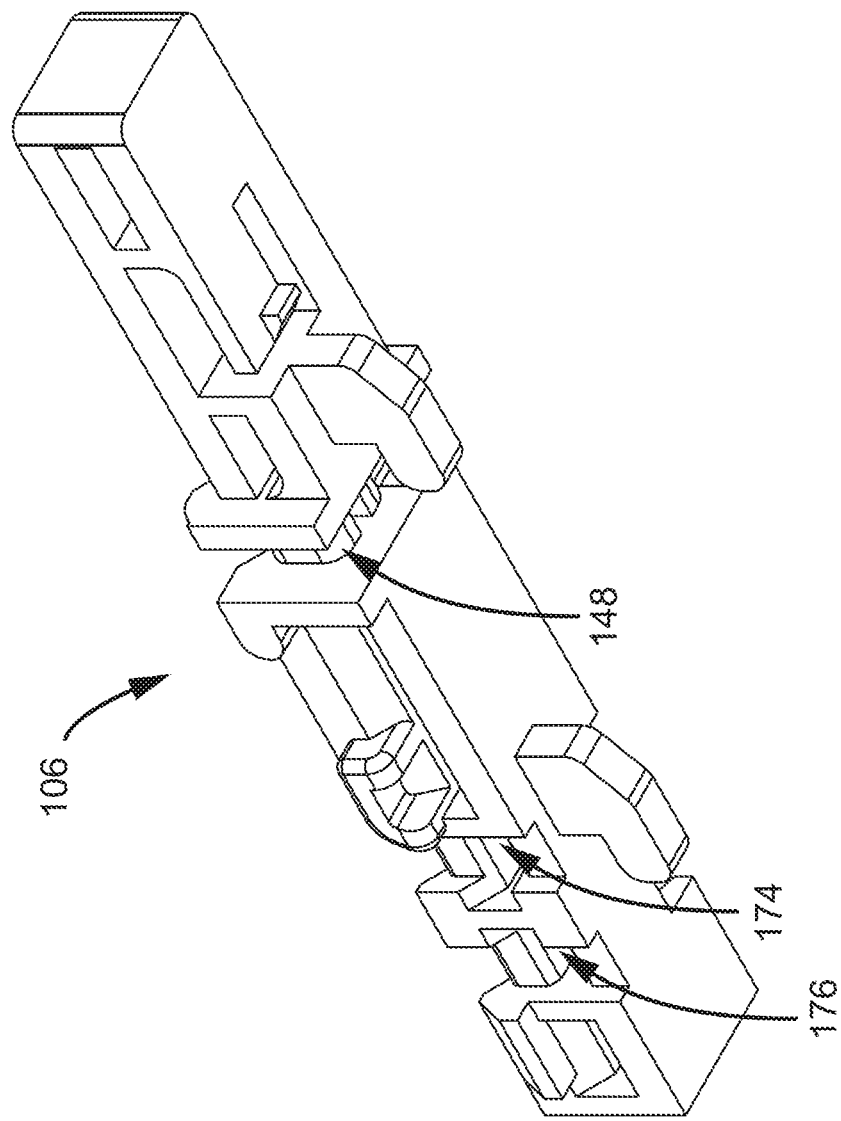
FIG. 8 is a further perspective view of the cable fixation body of FIG. 5.
Figure 9:
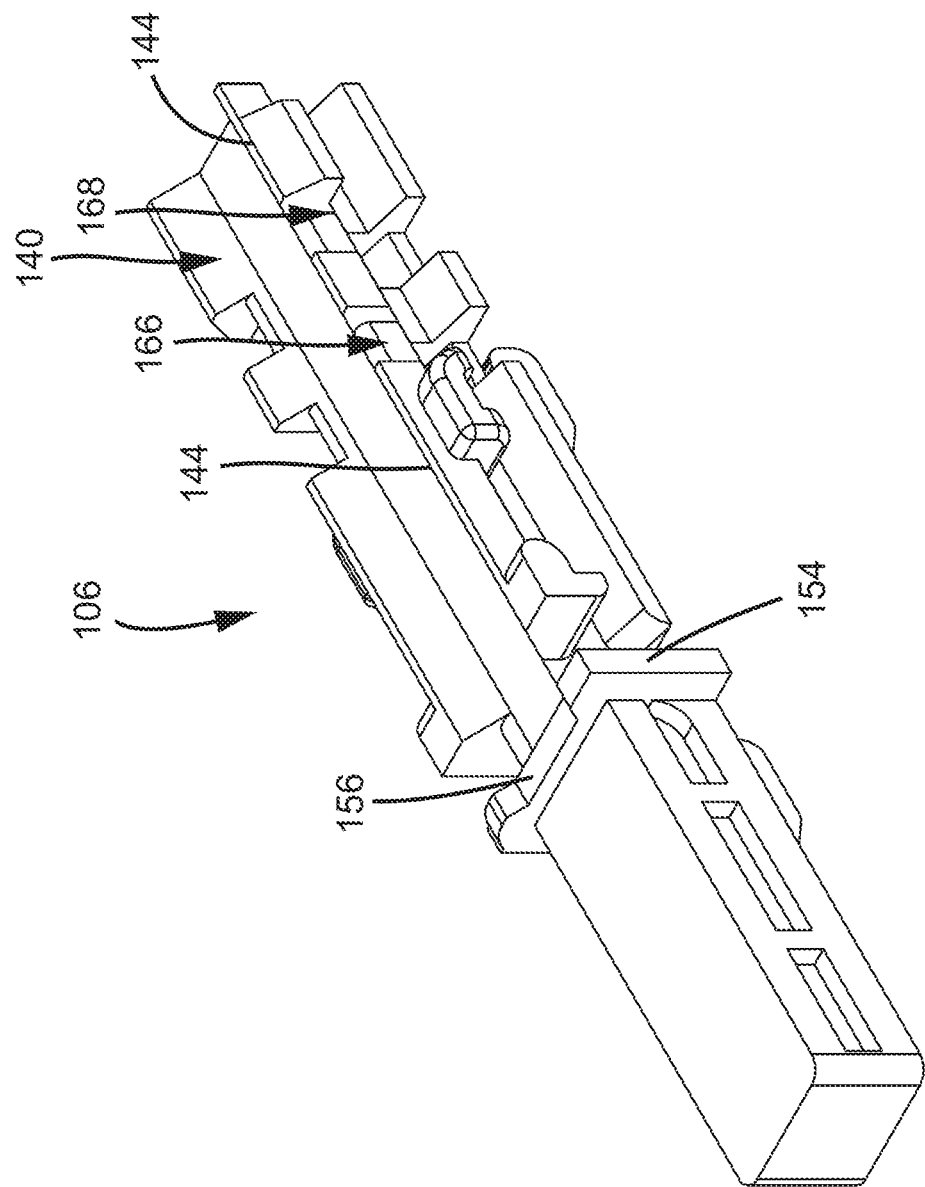
FIG. 9 is a further perspective view of the cable fixation body of FIG. 5.
Figure 10:
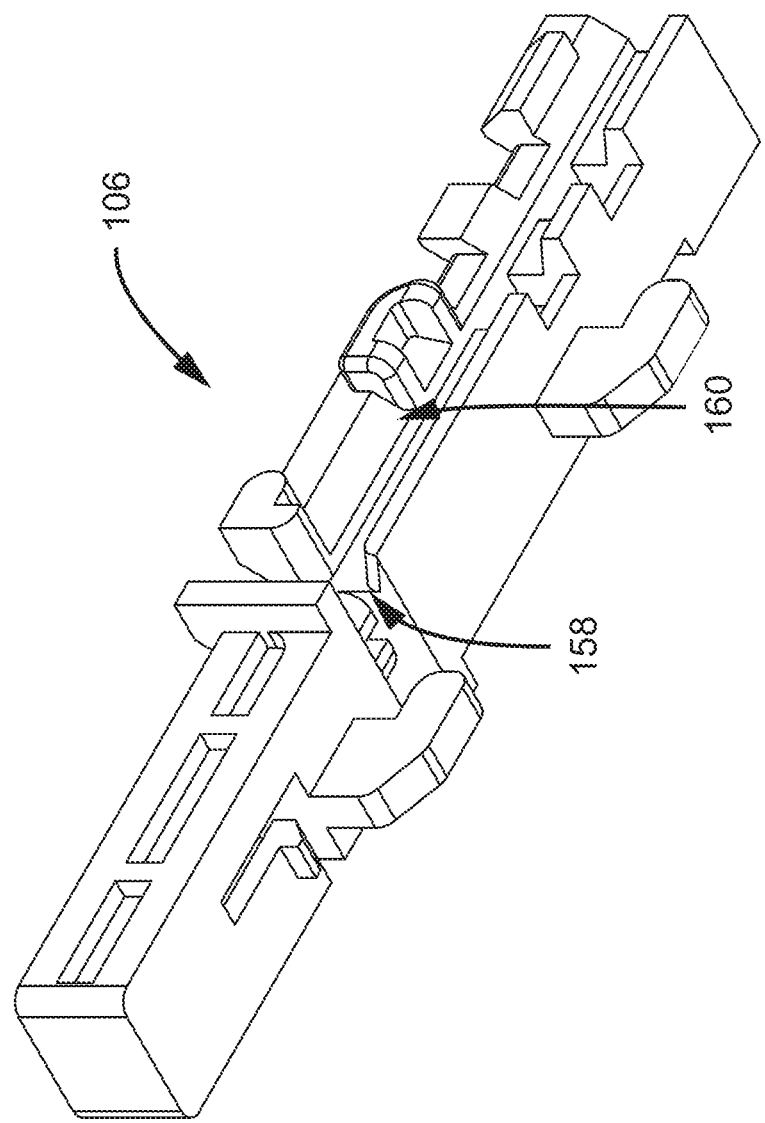
FIG. 10 is a further perspective view of the cable fixation body of FIG. 5.
Figure 11:
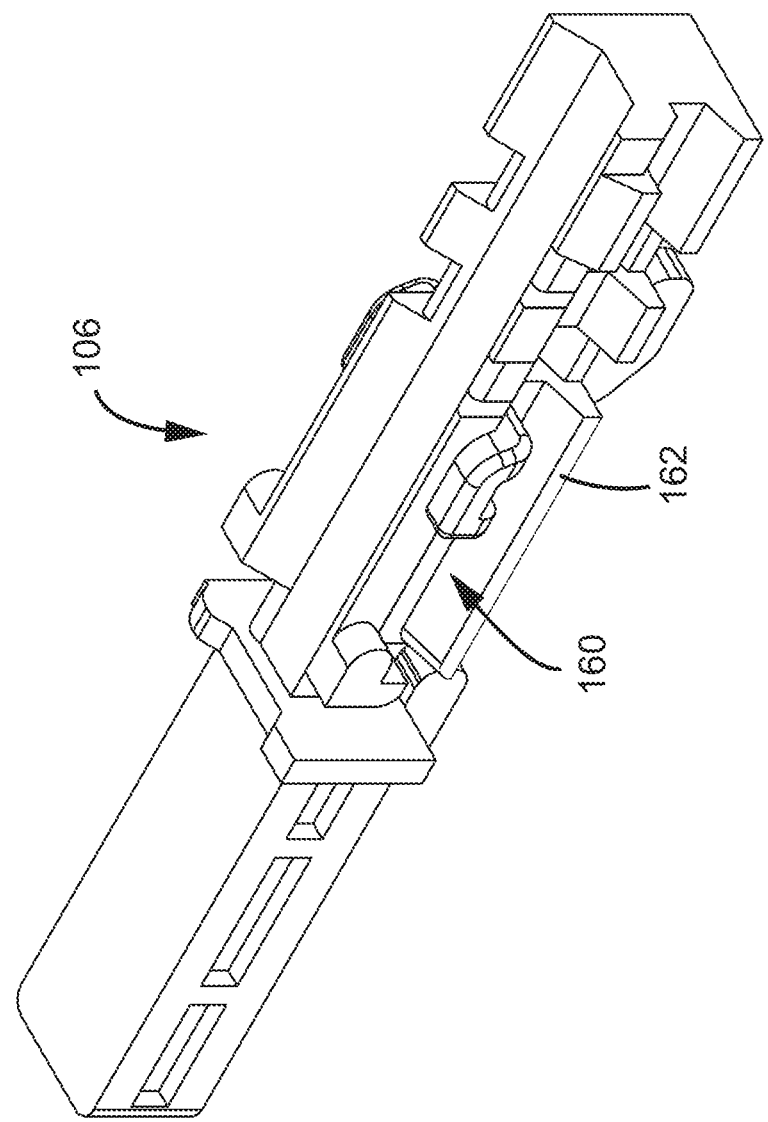
FIG. 11 is a further perspective view of the cable fixation body of FIG. 5.
Figure 12:
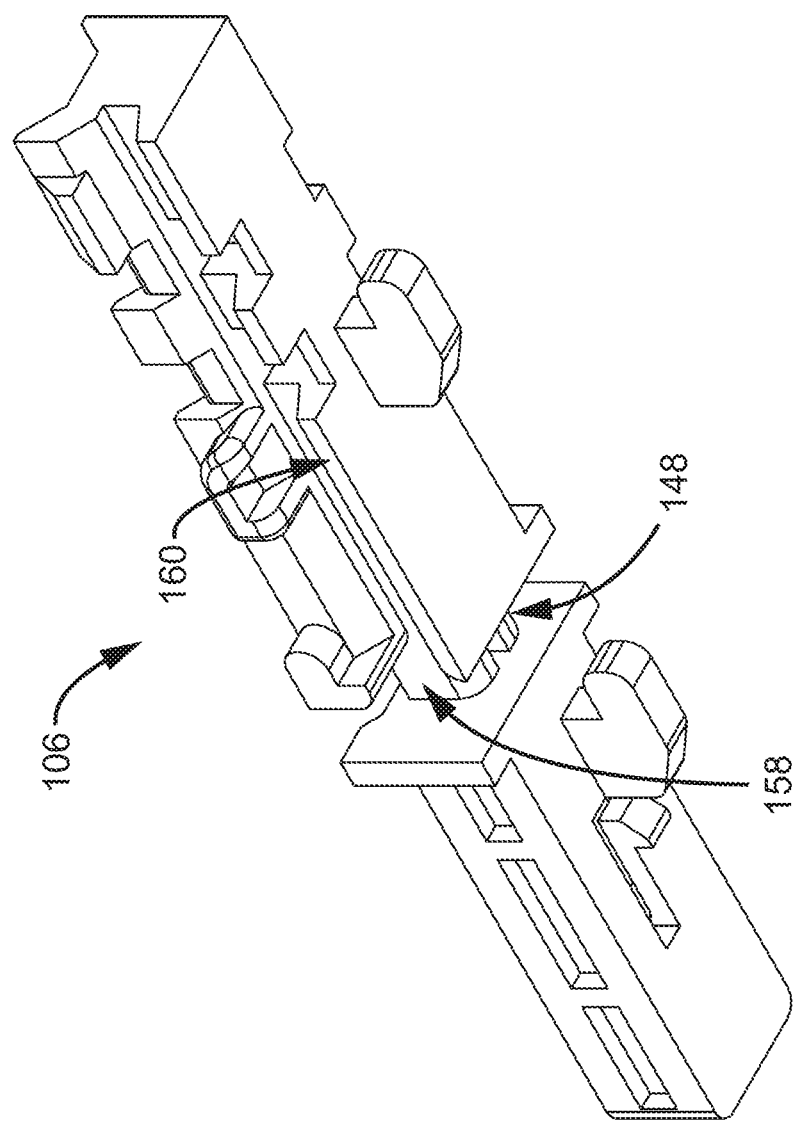
FIG. 12 is a further perspective view of the cable fixation body of FIG. 5.
Figure 13:
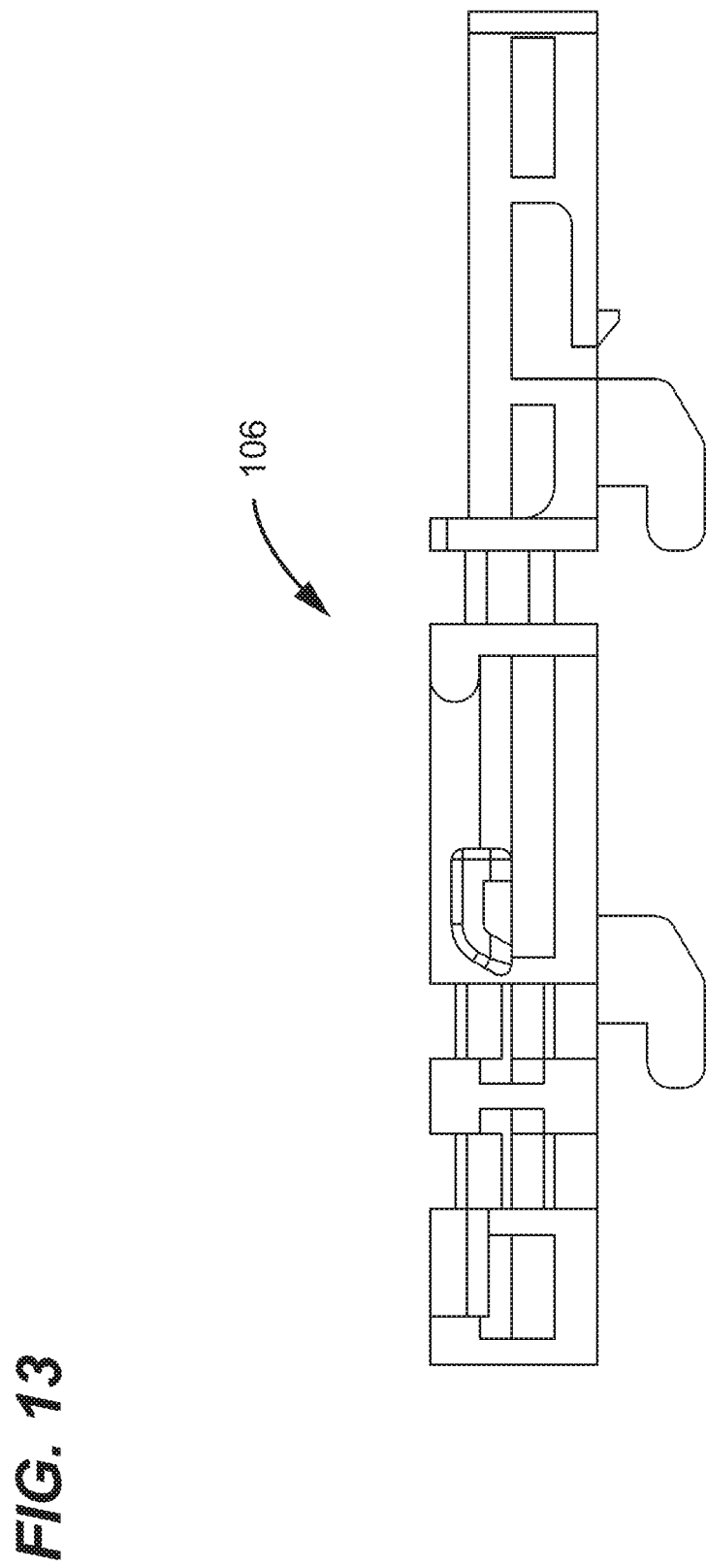
FIG. 13 is a side view of the cable fixation body of FIG. 5.

Referring to FIGS. 3-4, for ease of description, the fixation unit 100 has a proximal end 102 and a distal end 104. The unit 100 includes a body 106 and a base plate mounting portion 108 extending from the body 106. The outer jacket 11 is secured at a cable mounting region defined by the body 106 that is generally on an opposite side of the body 106 as the base plate mounting portion 108. A pair of ties 110 (e.g., zip ties) clamp the jacket 11 at the cable mounting region. The ties 110 also anchor the strength member 17, as will be described in greater detail below. In other examples, more or fewer ties than two (e.g., 1, 3, 4) can be used to clamp the cable jacket 11 and/or the strength member 17 to the body 106.

The base plate mounting portion 108 includes a pair of legs 112 having feet 114 extending therefrom, that are engageable with slots in the base plate 52. A slot engageable member 116 is configured and positioned to lock the legs 112 to their slots in the base plate 52. Using, e.g., a prying tool, the slot engageable member 116 can be disengaged from a slot of the base plate 52 in order to unlock the body 106 from the base plate 52.

Figure 14:
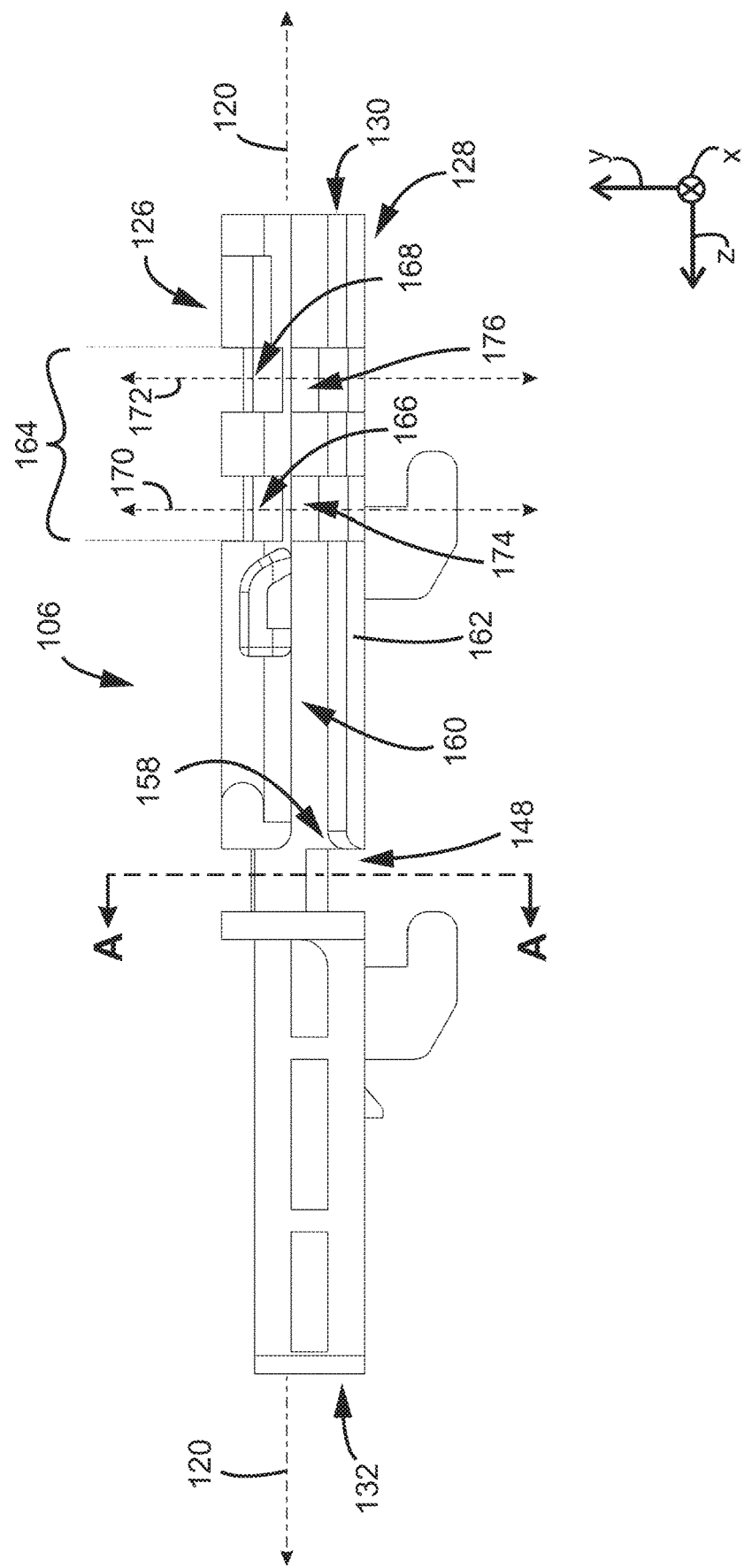
FIG. 14 is a further side view of the cable fixation body of FIG. 5.
Figure 15:
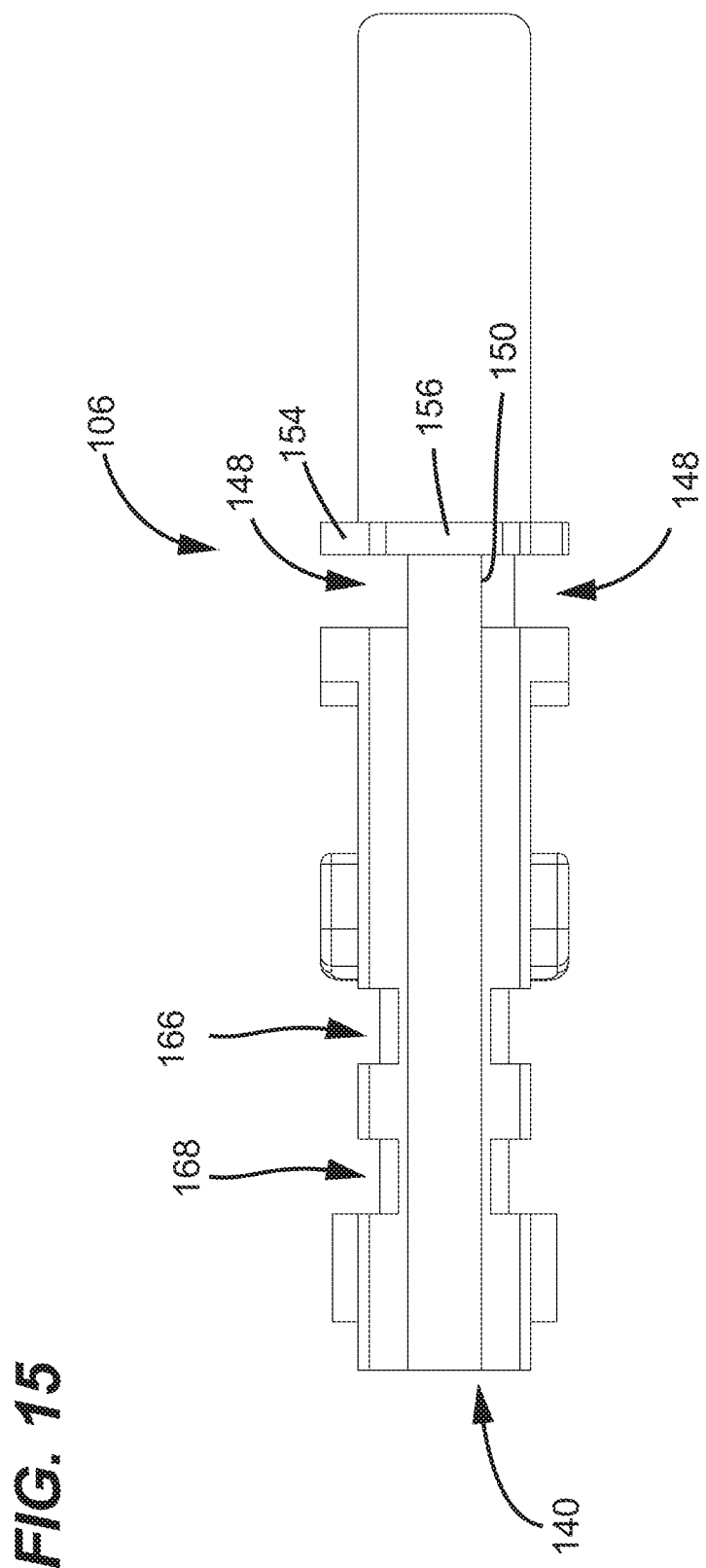
FIG. 15 is a top view of the cable fixation body of FIG. 5.
Figure 16:
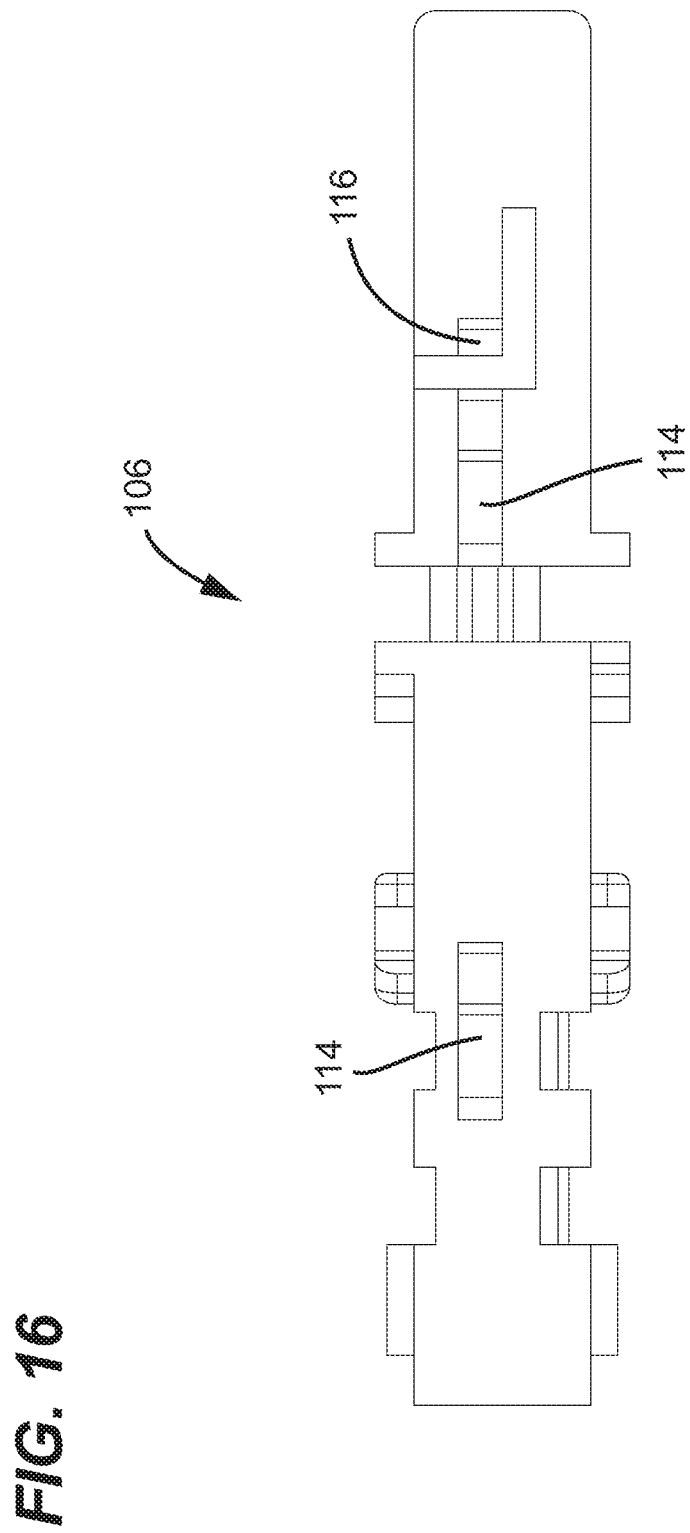
FIG. 16 is a bottom view of the cable fixation body of FIG. 5.
Figure 18:
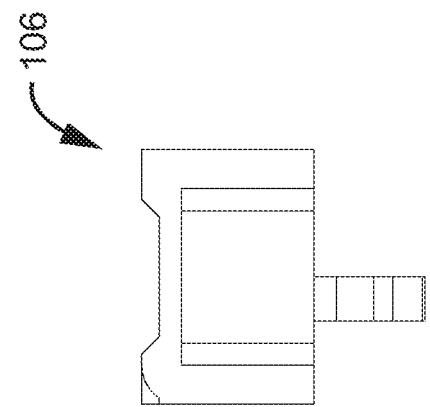
FIG. 18 is a further end view of the cable fixation body of FIG. 5.
Figure 17:
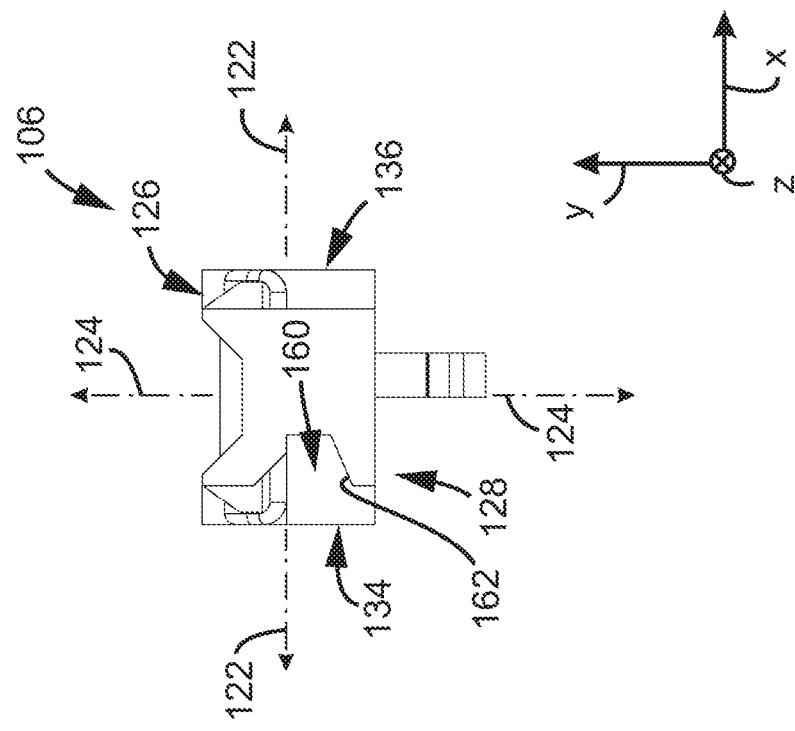
FIG. 17 is an end view of the cable fixation body of FIG. 5.

Referring now to FIGS. 5-18, the body 106 of the unit 100 will be described in greater detail. For ease of description, the body 106 defines a longitudinal axis 120 extending through the body's proximal end 130 and distal end 132 parallel to the z axis of a x-y-z three-dimensional coordinate system having mutually perpendicular axes x, y and z. In FIG. 14, the x axis extends in the positive direction into the page, and the x axis extends in the negative direction out of the page. In FIG. 17, the z axis extends in the positive direction into the page, and the z axis extends in the negative direction out of the page. The body 106 is also defines a transverse axis 122 extending through a first side 134 and an opposite second side 136 of the body 106 parallel to the x axis. The body 106 also defines a transverse axis 124 extending through a top 126 and a bottom 128 of the body 106 parallel to the y axis.

The body 106 defines a cable mounting region 140. The cable mounting region 140 includes a seat having a base 142 and two side walls 144, 146 extending from the base and configured to receive an outer jacket of a cable (such as the outer jacket 11 of the cable 10 (FIG. 1)). At the distal end of the cable mounting region 140 the seat opens to a guide channel 148. The guide channel 148 defines a strength member routing path that lies in a plane that is not parallel to any x-z plane nor to any y-z plane. In this example, the routing path lies in an x-y plane and partially surrounds the z axis. In an example usage, a fibrous strength member is guided into the channel 148 from the cable mounting region 140 at an entry 150. The channel 148 includes one or more curved guides 152, such that the strength member routing path defined by the channel 148 is arcuate. Within the x-y plane, the strength member routing path defines an arc lying in an x-y plane spanning an angle of at least 90 degrees, at least 180 degrees, more than 180 degrees, about or exactly 270 degrees, or greater than 270 degrees and less than 360 degrees about an axis parallel to the z axis (e.g., about the longitudinal axis 120). Alternatively, the strength member yarn can be looped more than a complete 360 degree loop.

The distal extreme of the channel 148 is defined by a divider wall 154. Optionally, the divider wall 154 includes a notch 156 at the top of the body 106, the notch 156 being positioned and adapted to hold up a buffer tube or exposed optical fiber(s) as they are routed into a closure volume.

In the example body 106, the strength member routing path defined by the channel 148 begins at the entry 150 and ends at an exit 158. The exit 158 is in communication with the longitudinal channel 160, extending longitudinally parallel to the z axis from the exit 158 in a proximal direction. The channel 160 is partially defined by a lower guide wall 162. The channel 160 defines a strength member routing path from the exit 158 parallel to the z axis along the side 134 of the body 106 and to a strength member anchoring region 164 positioned proximally from the channel 148.

The strength member anchoring region 164 includes a first recess 166 and an optional second recess 168. Both the first and second recesses 166, 168 are in communication with the channel 160. Both the first and second recesses 166, 168 are at least partially defined by the side wall 144 that partially defines the cable mounting region 140. Both the first and second recesses 166, 168 are at least partially positioned below the cable mounting region 140.

The first recess 166 is aligned along a reference line 170 parallel to the y axis with a first through hole 174. The first recess 166 is also adjacent the first through hole 174. The second recess 168 is aligned along a reference line 172 parallel to the y axis with a second through hole 174. The first recess 166 is positioned above the first through hole 174 and at least partially below the cable mounting region 140. The second recess 168 is positioned above the second through hole 176 and at least partially below the cable mounting region 140. The second recess 168 is also adjacent the second through hole 176.

The first and second through holes 174, 176 at least partially lie in the same x-z plane. The through holes 174, 176 are open at the sides 134 and 136 of the body extending therebetween parallel to the x axis (i.e., extending transversely to the longitudinal axis 120). Each of the first and second through holes 174, 176 is configured to receive a tie (such as the ties 110 of FIG. 4) therethrough. Such ties can be passed through the through holes 174, 176 and around a cable jacket seated at the cable mounting region 140 to thereby clamp the cable jacket to the body 106.

Referring now to FIGS. 19-29, steps of an example method of anchoring a fibrous strength member of a telecommunications cable are depicted and will be described. The method described is one example method. It will be appreciated that other example methods are possible, e.g., by eliminating one or more of the steps, adding one or more additional steps, and/or performing two or more of the steps in an order different than the one prescribed for the illustrated example.

Figure 19:
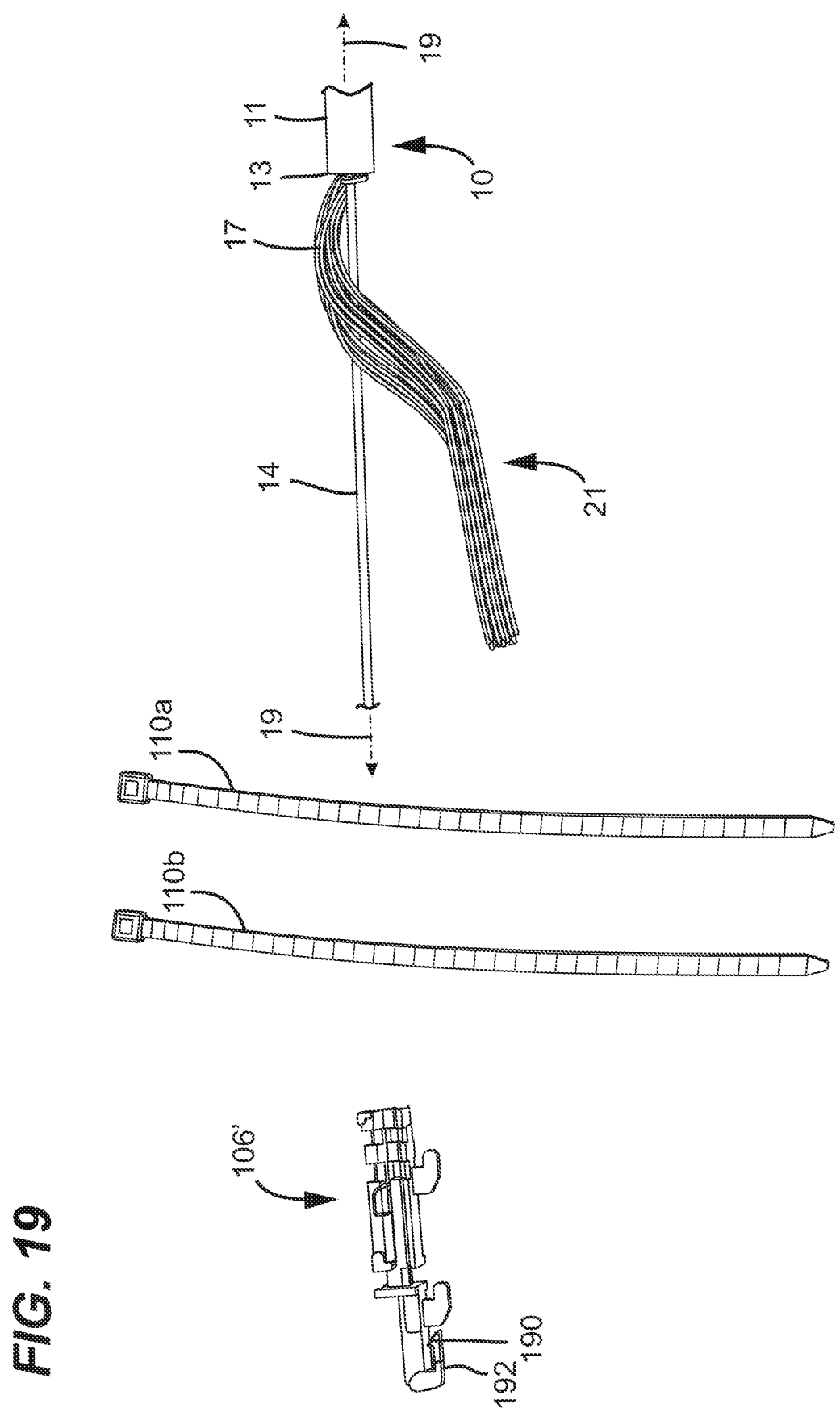
FIG. 19 depicts components of a cable fixation assembly and a cable and illustrates a step of an example method of anchoring a strength member of the cable in accordance with the present disclosure.

Referring to FIG. 19, there is depicted components of a cable fixation assembly and a cable, including the body 106', a cable 10, and ties 110 (in this example, zip ties). The cable 10 has an outer jacket 11, an inner buffer tube 14 holding one or more optical fibers, and a fibrous strength member 17 positioned generally between the outer jacket 11 and the buffer tube 14 and surrounding or partially surrounding the central longitudinal axis 19 of the cable 10. The strength member 17 is aramid yarn. The outer jacket 11 has been stripped, exposing a portion (an exposed portion 21) of the strength member 17 and a portion of the buffer tube 14 both extending distally from the distal end 13 of the outer jacket 11. The body 106' is identical to the body 106 except that the base plate mounting portion of the body 106' includes a slot engageable locking member 190 projecting from a flexibly resilient arm 192. The locking member 190 is removably engageable with a slot of a slotted base plate to lock the body 106' to the base plate.

Figure 20:
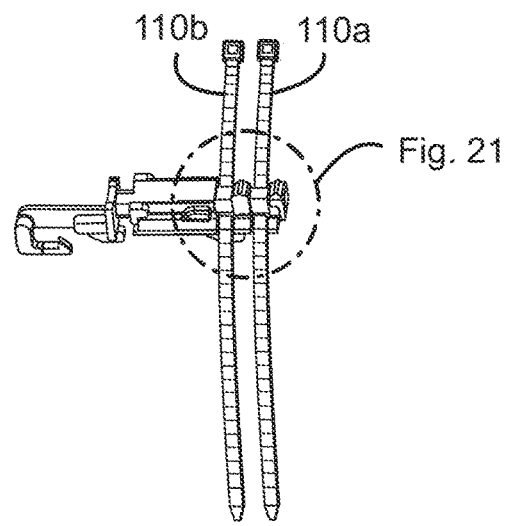
FIG. 20 represents a further step of the method.
Figure 21:
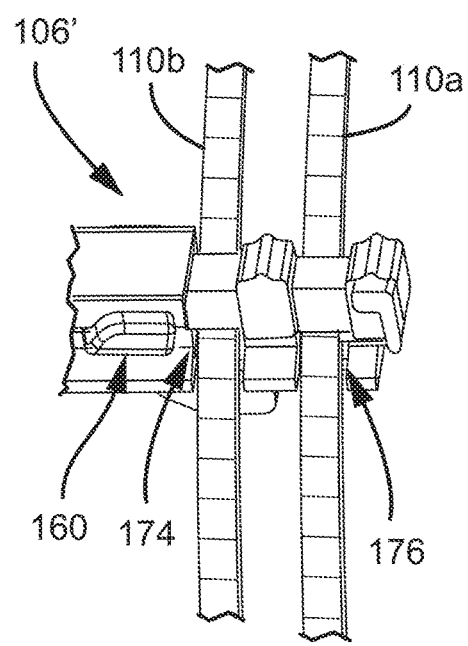
FIG. 21 is an enlarged view of the called out portion of FIG. 20.

Referring to FIGS. 20-21, subsequent to the method step illustrated in FIG. 19, first and second zip ties 110a and 110b are fed through the through holes 174 and 176, respectively.

Figure 22:
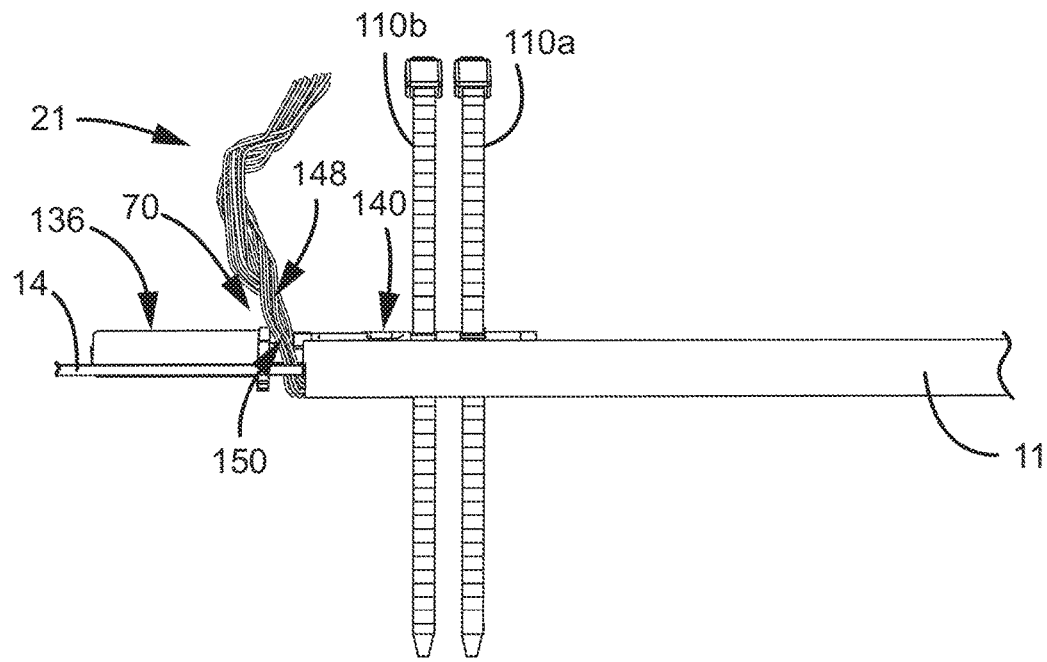
FIG. 22 represents a further step of the method.

Referring to FIG. 22, in a further method step subsequent to the step illustrated in FIGS. 20-21, a portion of the outer jacket 11 is held (e.g., by hand) to the cable mounting region 140 of the body. In addition, a first portion 70 of the exposed length of the strength member is positioned in the guide channel 148 via the entry 150.

Figure 23:
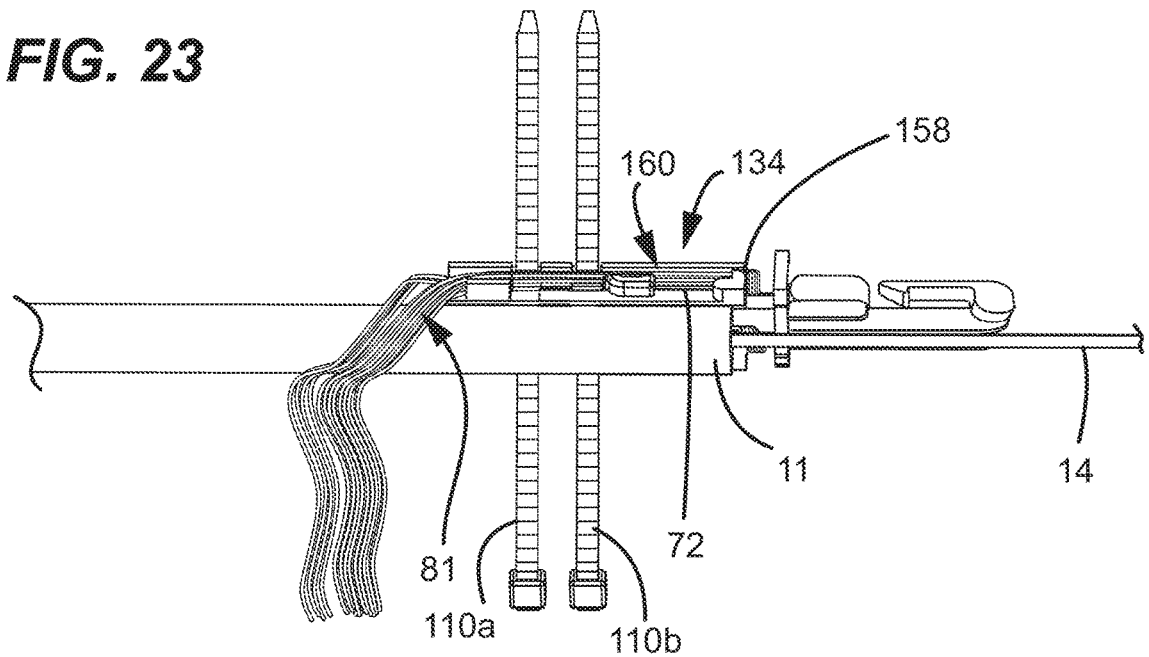
FIG. 23 represents a further step of the method.

Referring to FIG. 23, in a further method step subsequent to the step illustrated in FIG. 22, the portion 70 of the exposed length of the strength member has been routed greater than 180 degrees (e.g., approximately 270 degrees) around the longitudinal axis of the body 106' within the channel 148 to the opposite side 134 of the body 106', and a portion 72 has been routed within the channel 160 via the exit 158 from the channel 148.

Figure 24:
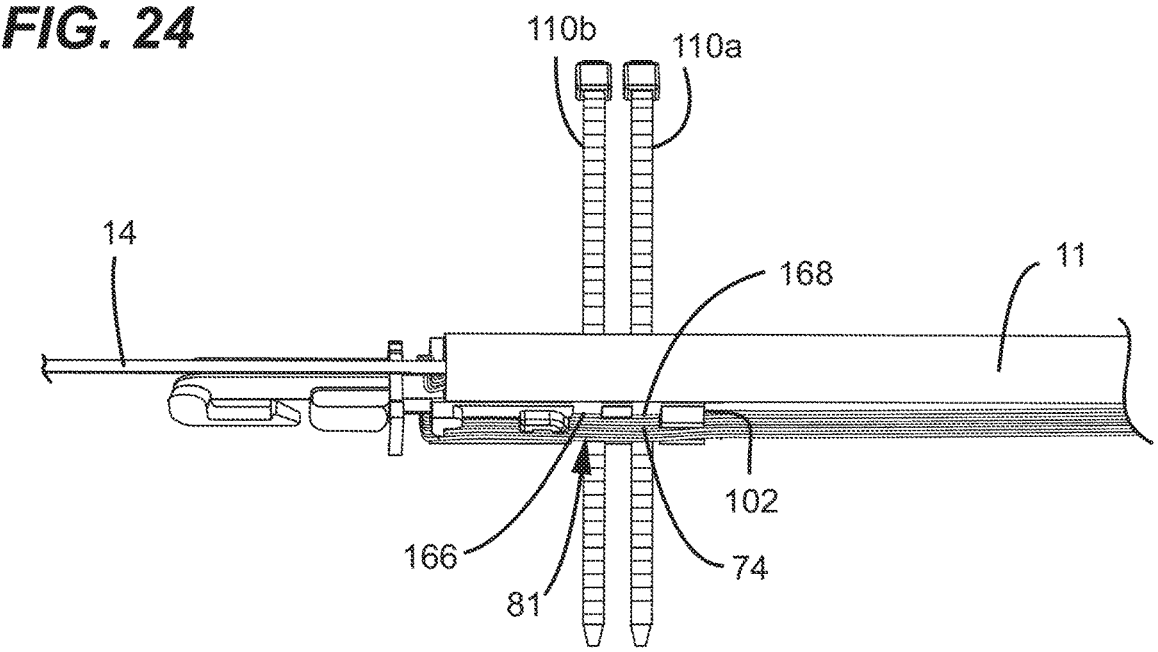
FIG. 24 represents a further step of the method.

Referring to FIG. 24, the strength member has been routed via the channel 160 such that a portion 74 of the exposed strength member extends proximally beyond the proximal end 102 of the body 106' and such that the portion 74 extends proximally beyond the recess 168.

Figure 25:
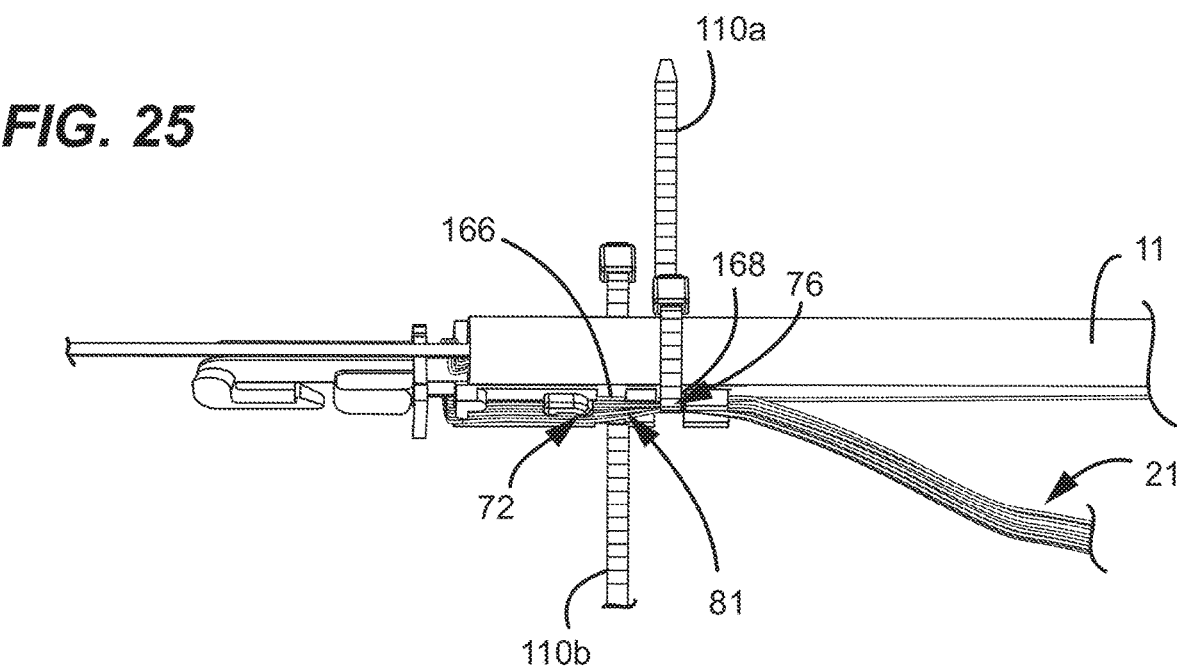
FIG. 25 represents a further step of the method.

Referring to FIG. 25, in a further method step subsequent to the step(s) illustrated in FIG. 23 and/or FIG. 24, the tie 110a has been looped around the jacket 11 and a portion 76 of the exposed length of the strength member and tightened there-around such that, optionally, the portion 76 of the exposed length of the strength member has been pulled upwards into the recess 168 and towards the outer jacket 11. In addition, the jacket 11 is now clamped to the cable mounting region 140 by the tie 110a. More particularly, the jacket 11 is secured between the base 142 (FIG. 5) of the cable mounting region 140, and the tie 110a.

Figure 26:
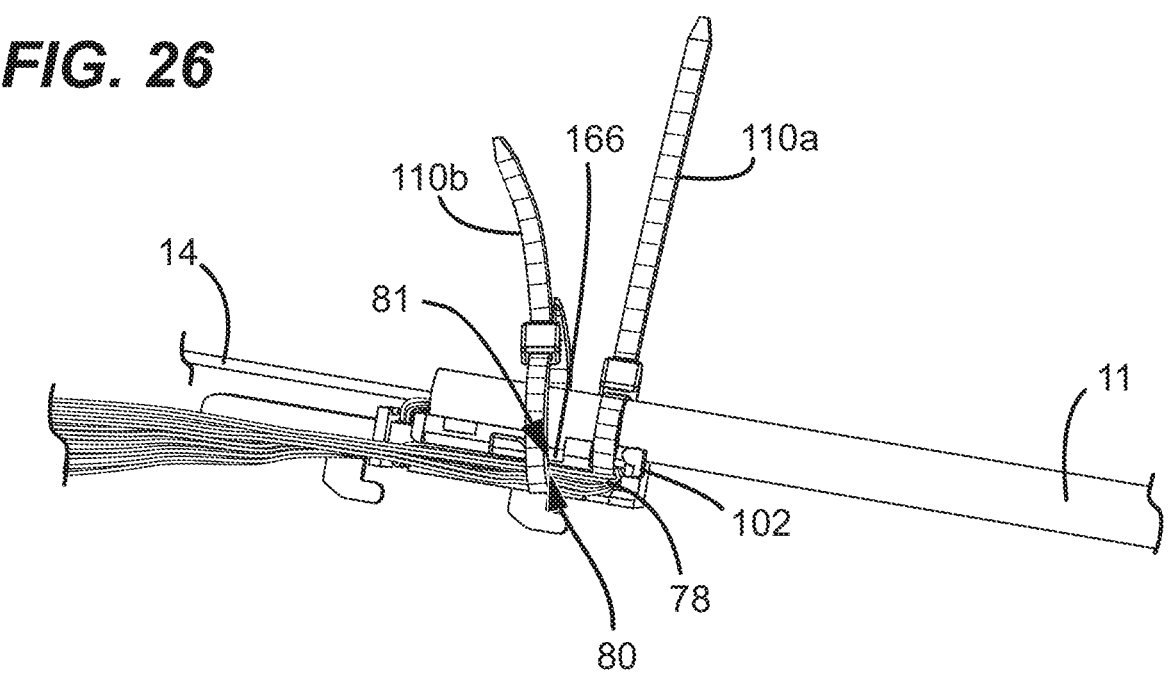
FIG. 26 represents a further step of the method.

Referring to FIG. 26, in a further method step subsequent to the step illustrated in FIG. 25, a portion 78 of the exposed length of the strength member has been overlapped over an exteriorly facing surface 181 of the tie 110a. Subsequent to the overlapping, the tie 110b has been loosely looped around the cable jacket 11 and over portions 80 and 81 of the exposed length of the strength member. The portion 81 is at least partially covered by the portion 80. The portion 81 extends from an end of the portion 72 that is disposed in the channel 160 (see FIGS. 24-25).

Figure 27:
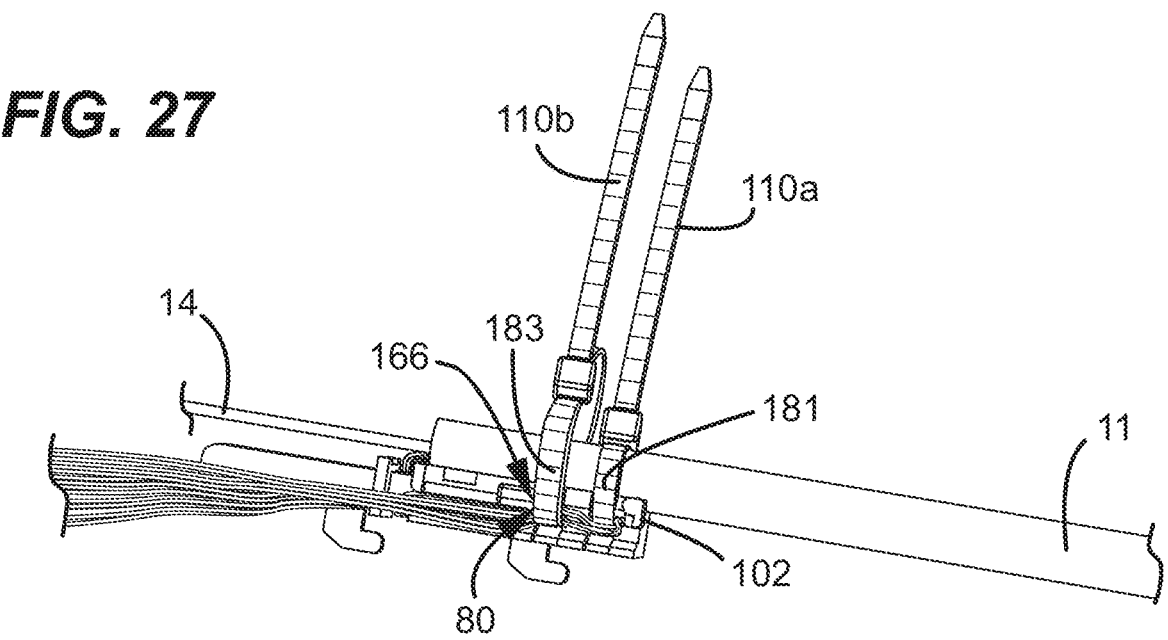
FIG. 27 represents a further step of the method.
Figure 28:
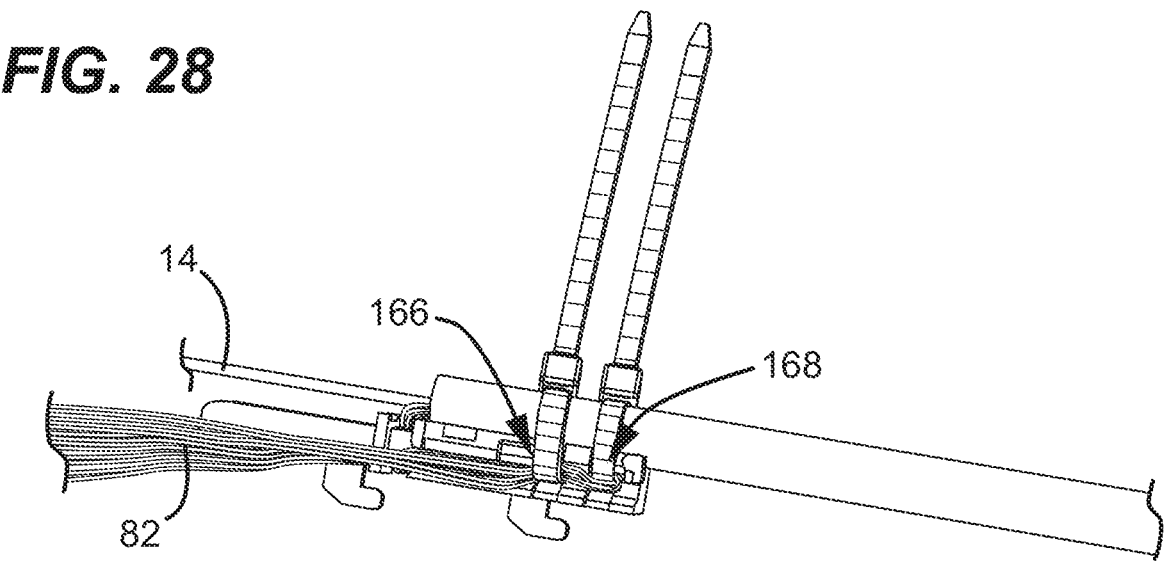
FIG. 28 represents a further step of the method.

Referring to FIGS. 27-28, in a further method step subsequent to the step illustrated in FIG. 26, the tie 110b has been tightened (more so in FIG. 28 than in FIG. 27) around the portion 80 of the exposed length of the strength member such that at least the portion 81, and also the portion 80, of the exposed length of the strength member have been pulled upwards into the recess 166 and towards the outer jacket 11. In addition, the outer jacket 11 is now further clamped to the cable mounting region 140 by the tie 110b. Thus, an interiorly facing surface (opposite the exteriorly facing surface 183) of the tie 110b abuts and holds the portion 81 and, optionally, also the portion 80. A free end portion 82 of the exposed length of strength member extends distally beyond the tie 110b from an end of the portion 80 anchored by the tie 110b.

Figure 29:
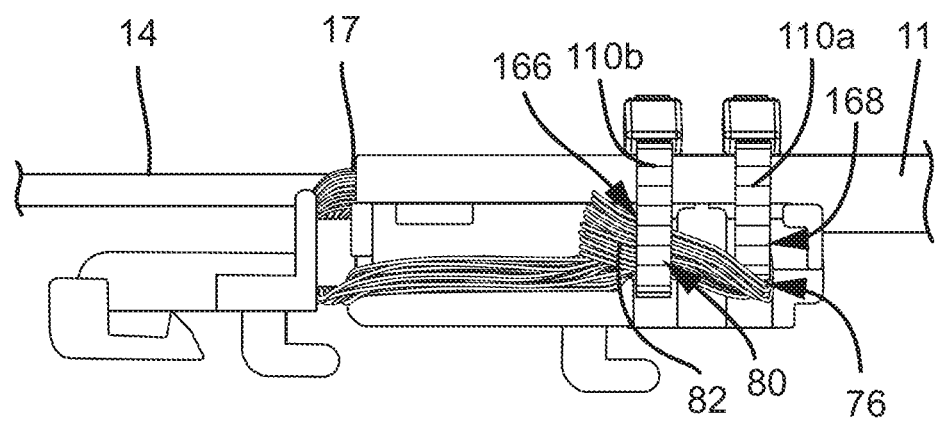
FIG. 29 represents a further step of the method.

Referring to FIG. 29, in a further method step subsequent to the step illustrated in FIG. 28, a free end tail portion of the portion 82 of the length of the strength member has been cut off, and the completed anchoring of the strength member 17 is illustrated. The containment of portions of the strength member 17 in the channels 148 and 160, and the tightening of the portion 81 (and, optionally, one or both of the portions 76, 80) of the strength member by pulling those portions towards the cable within the recesses 168 and 166, respectively, can provide improved anchoring of the strength member and help to minimize spread of the yarn threads. In some examples, by employing the method illustrated, at least a predetermined minimum amount of strength member slackness, at least in the portion 72, is eliminated, e.g., at least 0.5 millimeters (mm) of slack, at least 1.0 mm of slack, at least 1.5 mm of slack, at least 2.0 mm of slack, at least 3.0 mm of slack, at least 5.0 mm of slack, or more. It should be appreciated that, in some examples, prior to tightening either of the ties against the strength member, the strength member is pulled taut to further reduce slack in the finally anchored assembly.

Figure 30:
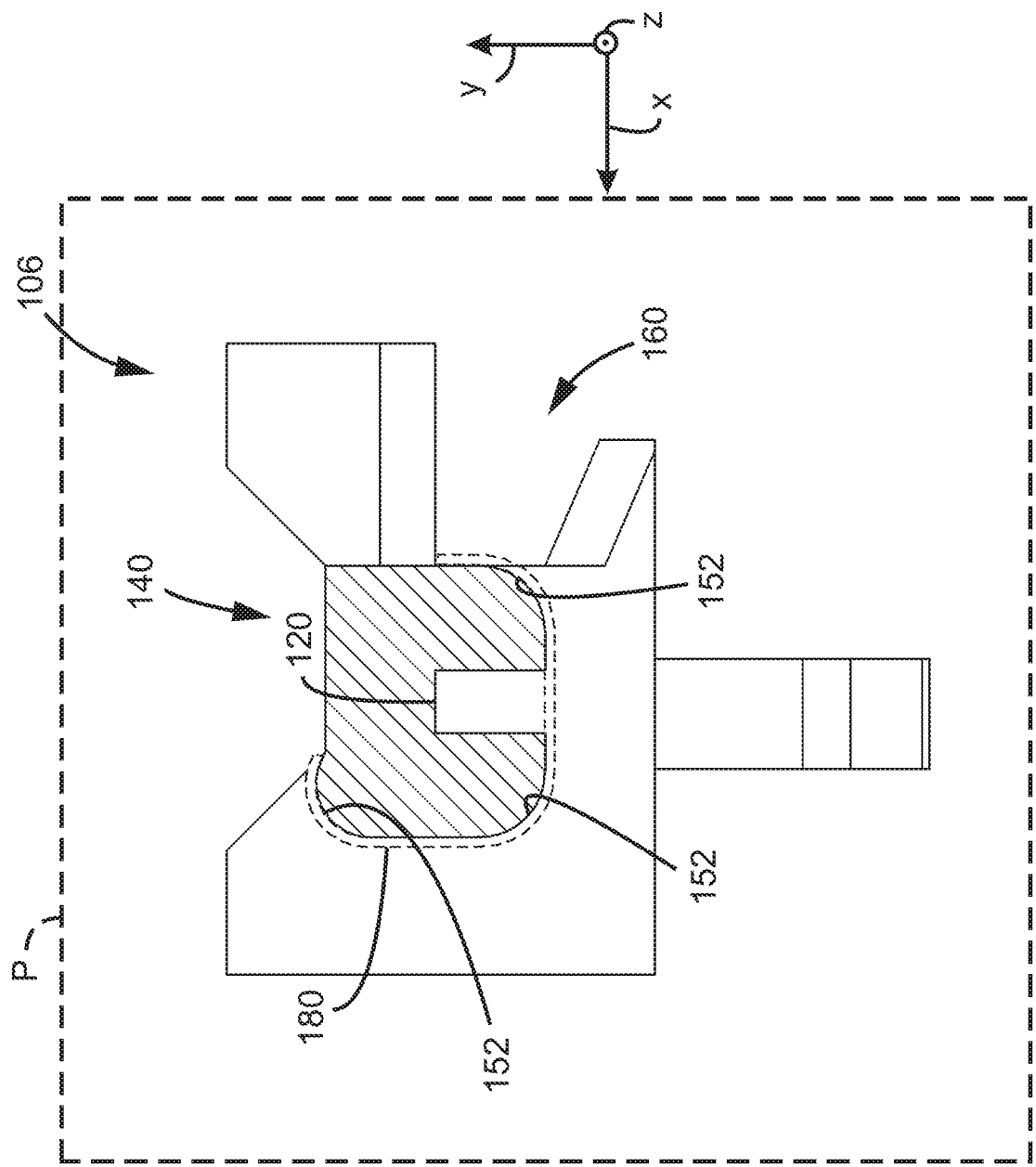
FIG. 30 is a cross-sectional view of the cable fixation body of FIG. 5 taken along the line A-A in FIG. 14.
Figure 31:
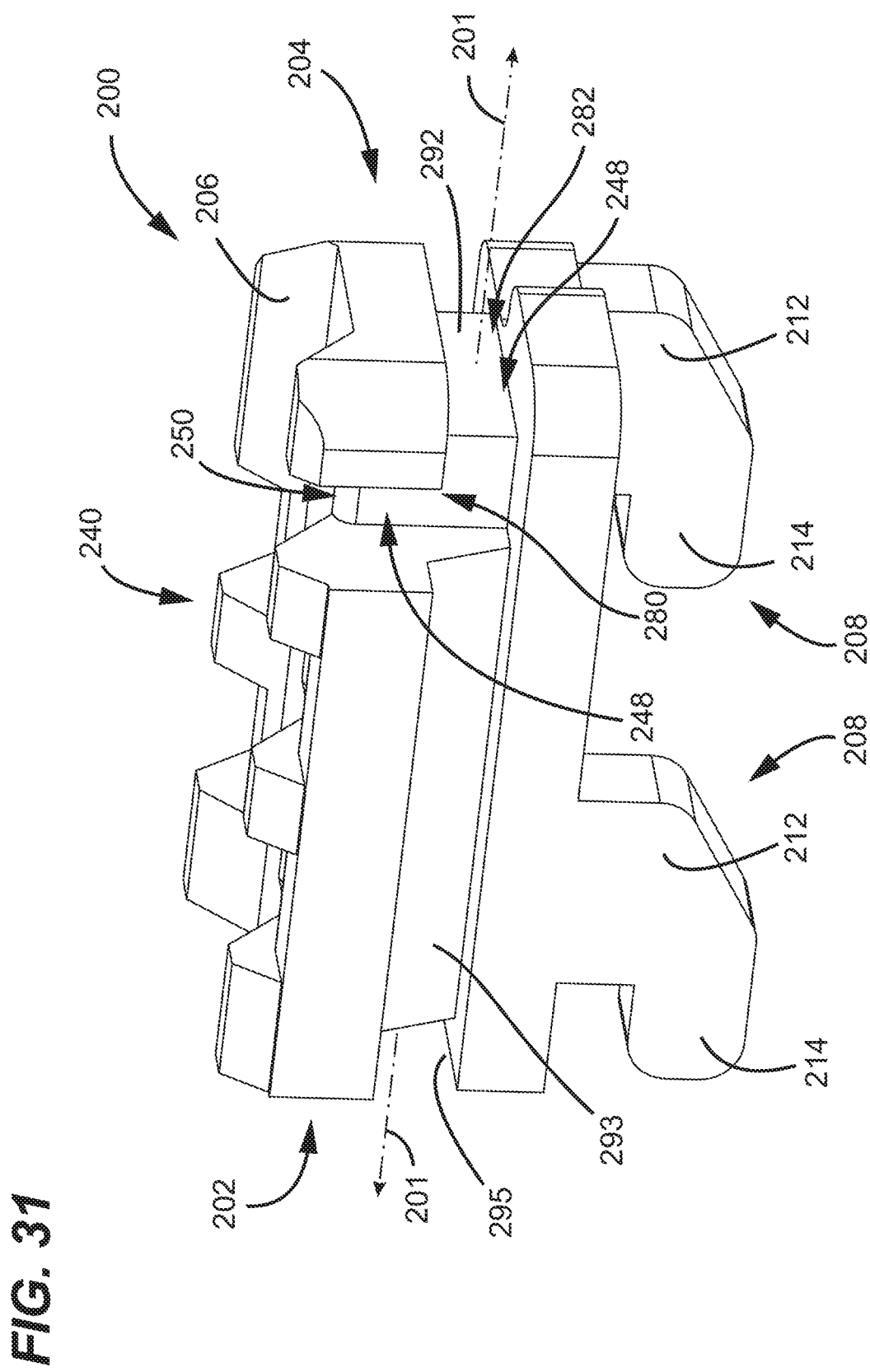
FIG. 31 is a perspective view of a further example cable fixation unit in accordance with the present disclosure.
Figure 32:
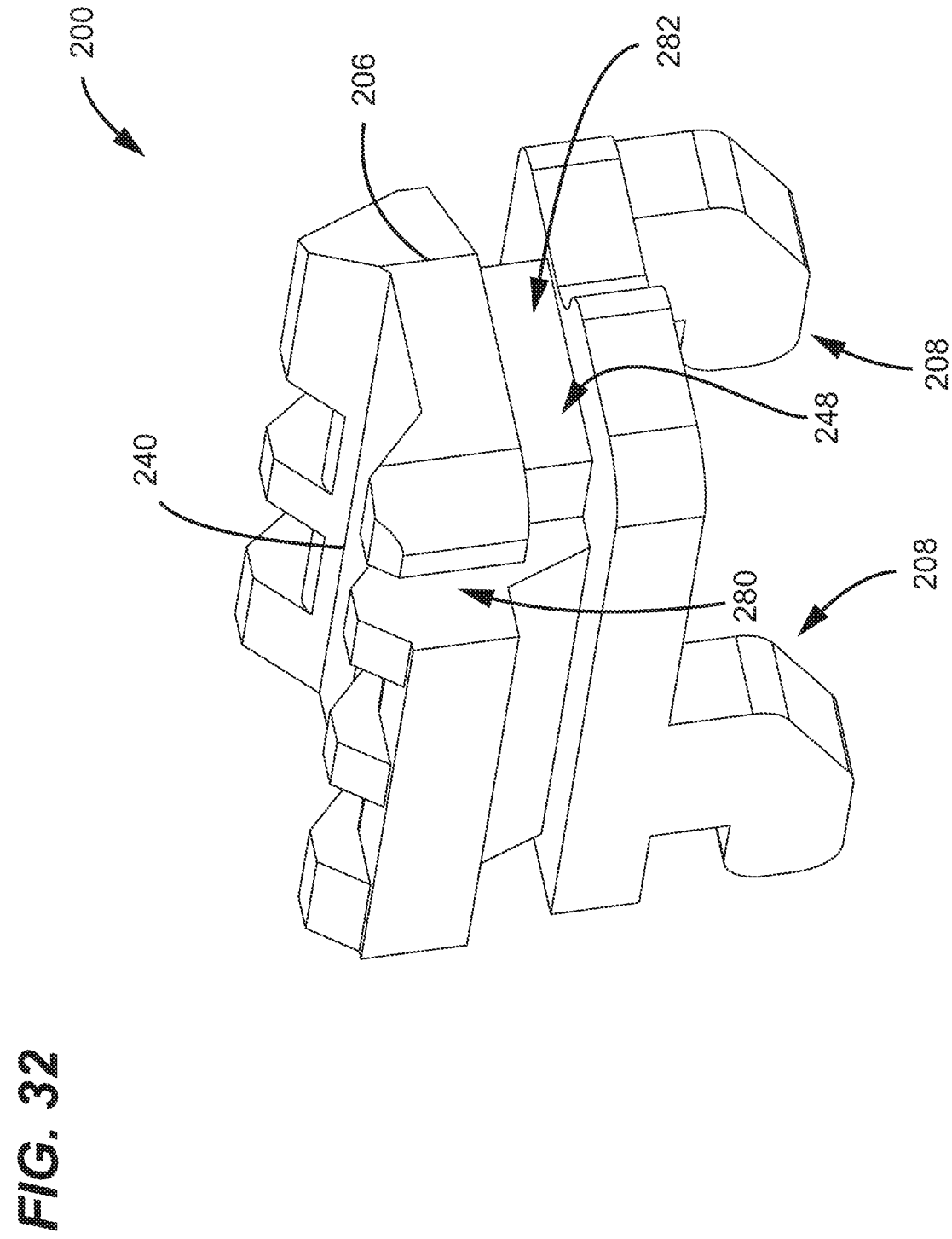
FIG. 32 is a further perspective view of the cable fixation unit of FIG. 31.
Figure 33:
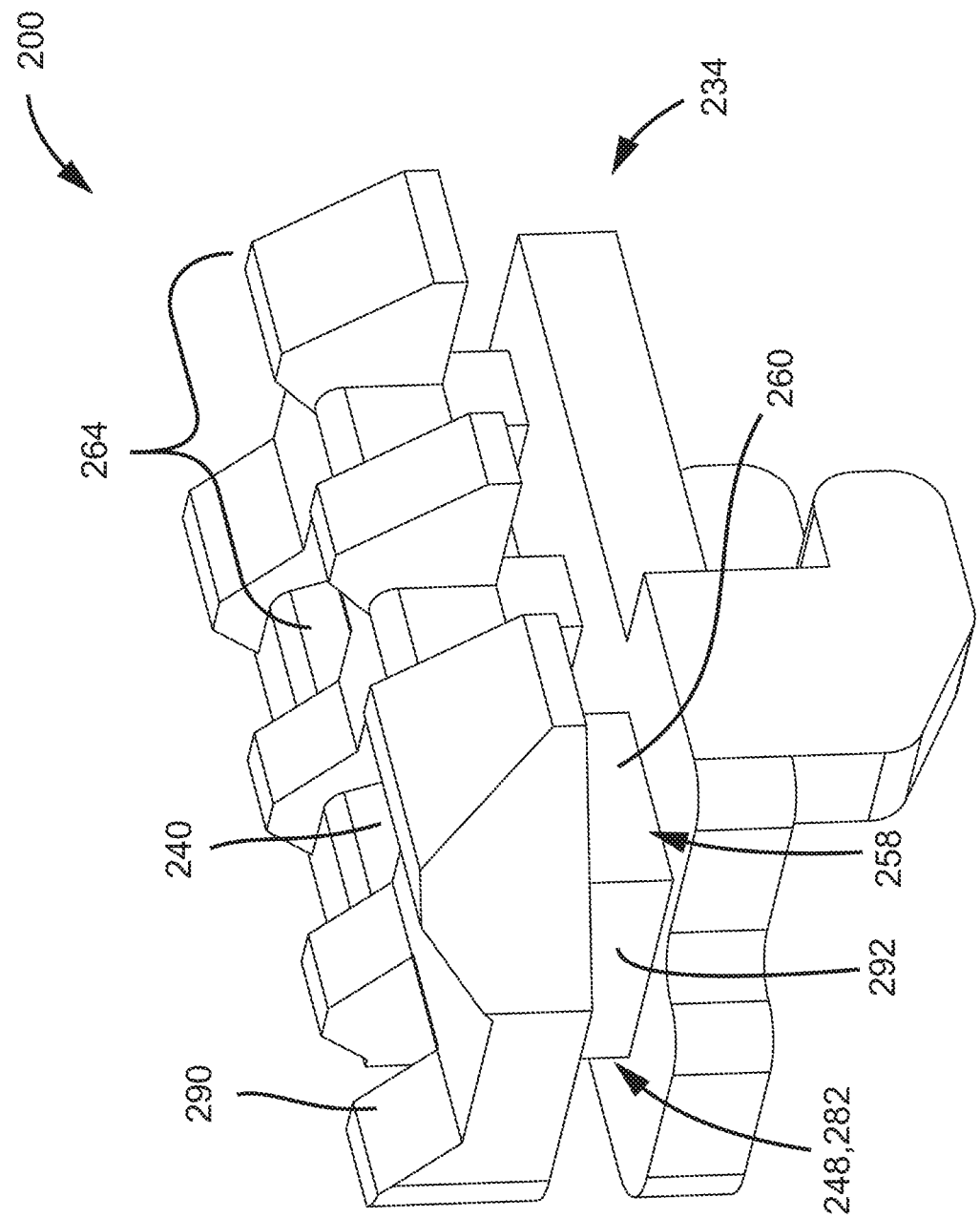
FIG. 33 is a further perspective view of the cable fixation unit of FIG. 31.
Figure 34:
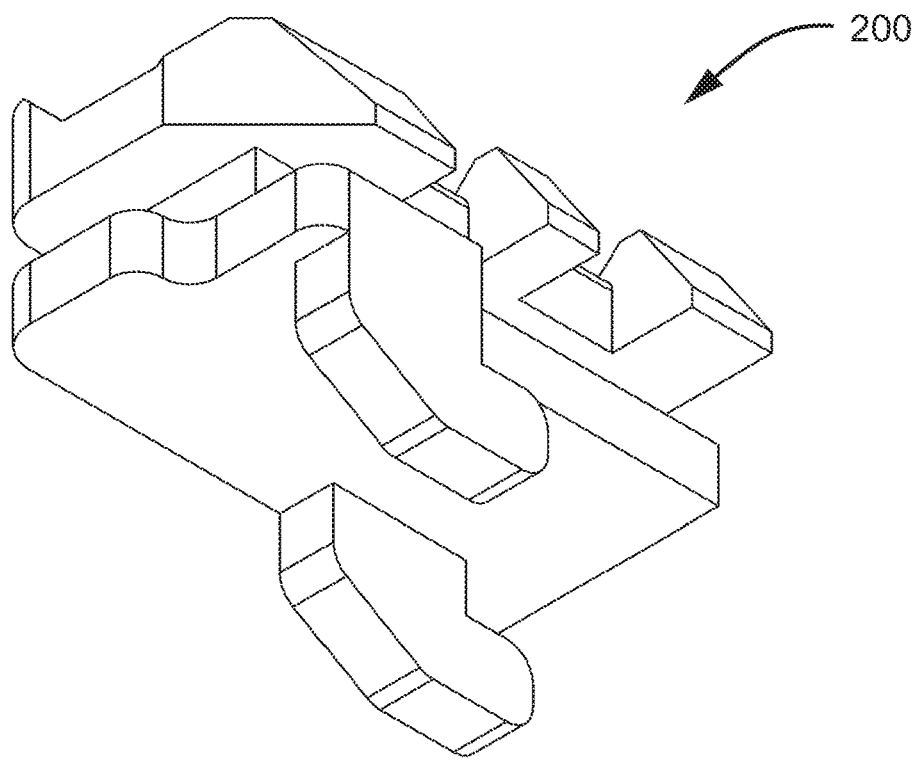
FIG. 34 is a further perspective view of the cable fixation unit of FIG. 31.
Figure 35:
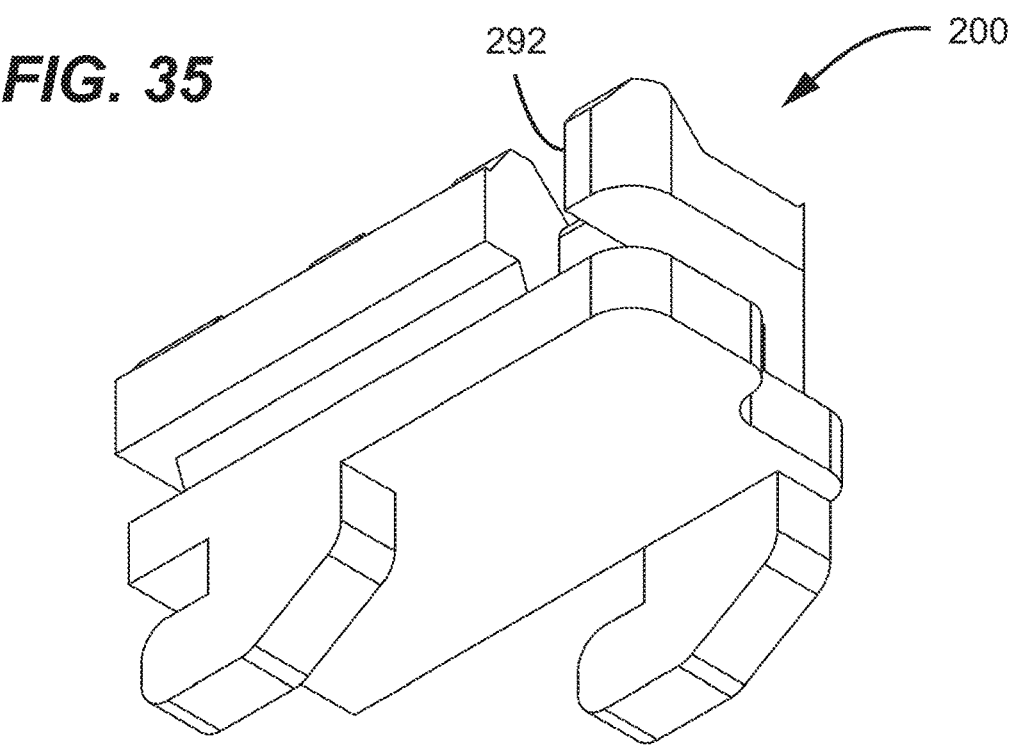
FIG. 35 is a further perspective view of the cable fixation unit of FIG. 31.
Figure 36:
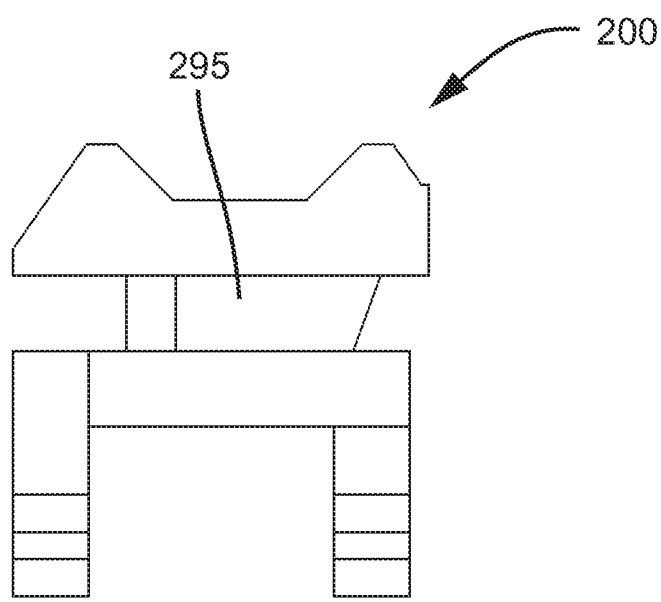
FIG. 36 is a proximal end view of the cable fixation unit of FIG. 31.
Figure 37:
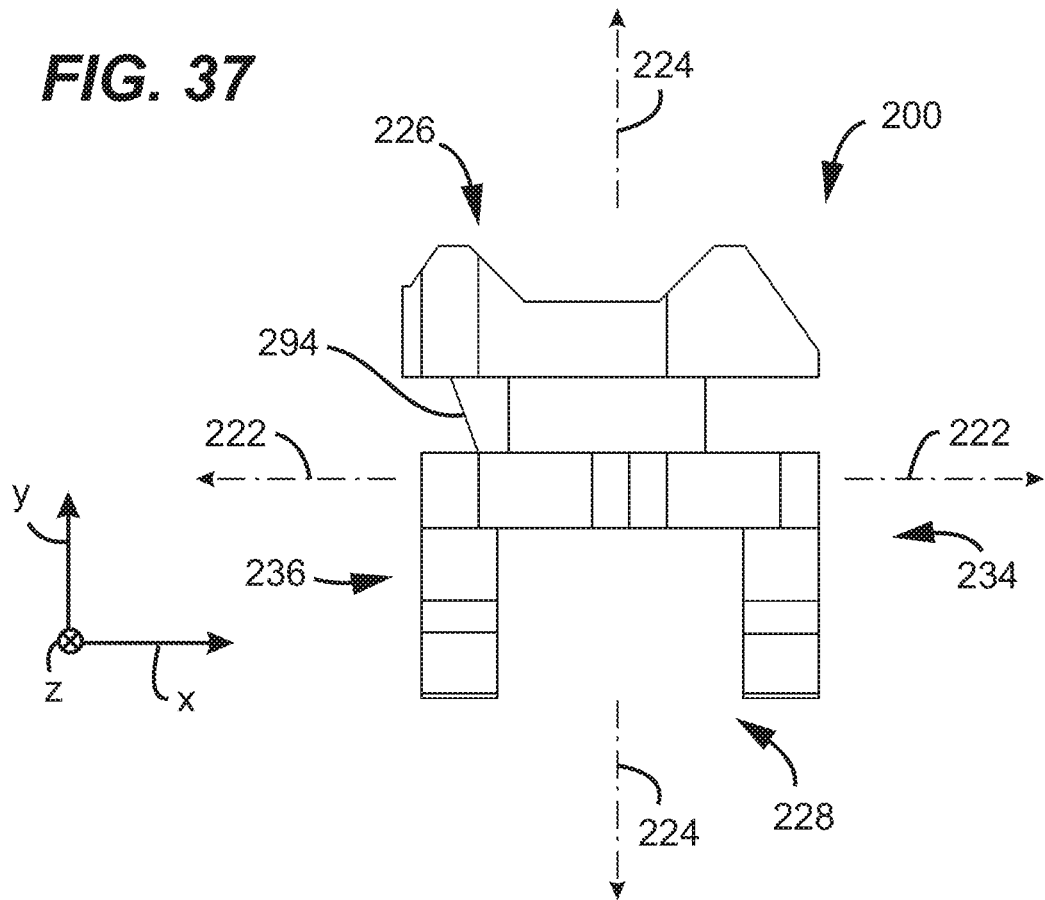
FIG. 37 is a distal end view of the cable fixation unit of FIG. 31.
Figure 38:
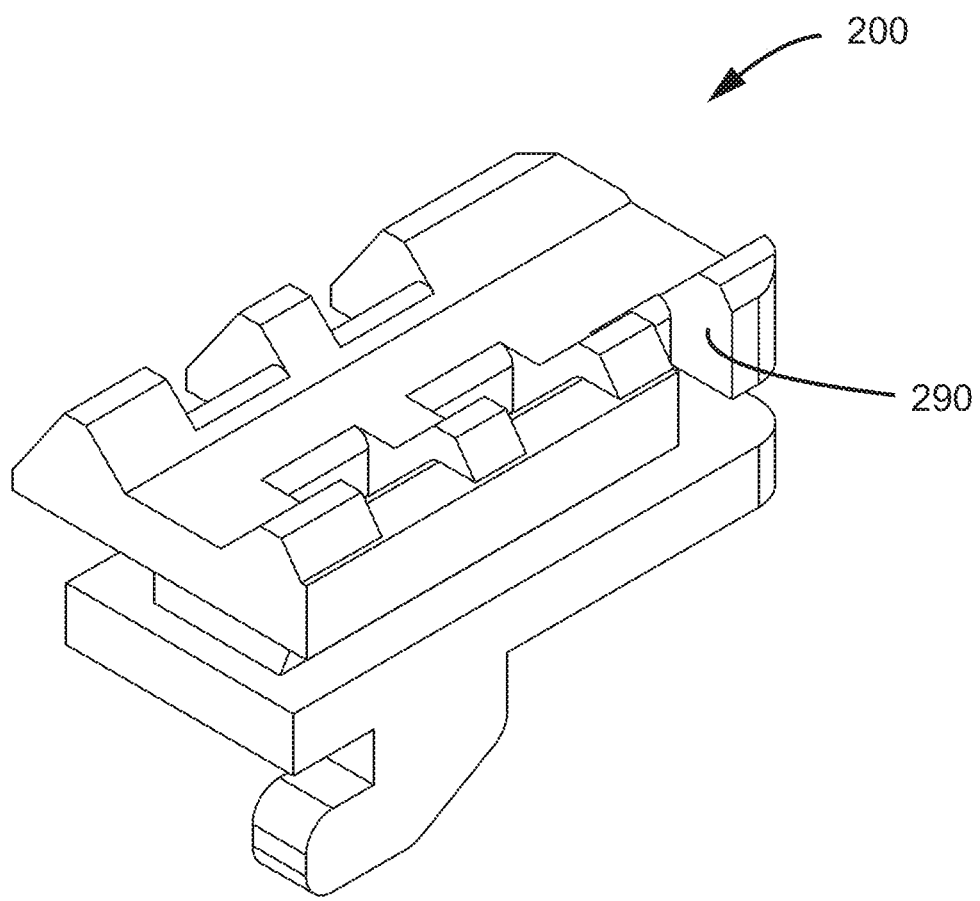
FIG. 38 is a further perspective view of the cable fixation unit of FIG. 31.

Referring to FIG. 30, an example strength member routing path 180 within the guide channel 148 of the body 106 described above is depicted. In FIG. 30, the positive z axis extends out of the page. The routing path 180 is arcuate (i.e., includes one or more arcuate portions) and partially surrounds the longitudinal axis 120 of the body 106, lying in an x-y plane P. In this example, an arc defined by the routing path 180 spans an angle around the axis 120 of greater than 180 degrees. In this example, the arc defined by the routing path 180 spans an angle of between 260 degrees and 280 degrees, or approximately or exactly 270 degrees. For example, the path 180 defines an arc between the entry 150 and the exit 158 (FIGS. 5, 10) of between 260 degrees and 280 degrees, or approximately or exactly 270 degrees. Thus, overall, and including the follow-on routing path in the channel 160, it should be appreciated that the overall routing path of the exposed strength member is in all three dimensions x, y and z. This labyrinthine nature of the routing path can further improve the anchoring of the strength member.

Referring to FIGS. 31-38, a further example cable fixation unit 200 will be described. The cable fixation unit 200 includes features that are similar to those of the body 106 of the cable fixation unit 100 described above, and the following description will focus primarily on differences between the cable fixation unit 200 and the cable fixation unit 100.

For ease of description, the fixation unit 200 extends along a longitudinal axis 201 from a proximal end 202 to a distal end 204 parallel to the z axis of a x-y-z three-dimensional coordinate system having mutually perpendicular axes x, y and z. The fixation unit 200 defines a transverse axis 222 extending through a first side 234 and an opposite second side 236 of the unit 200 parallel to the x axis. The unit 200 also defines a transverse axis 224 extending through a top 226 and a bottom 228 of the unit 200 parallel to the y axis.

The unit 200 includes a body 206 and a base plate mounting portion 208 extending from the body 206.

The unit 200 has a reduced longitudinal size relative to, e.g., the body 106 of the unit 100 described above. The reduced size of the cable fixation unit 200 can save manufacturing cost for the cable fixation unit and maximize fiber management space (by minimizing cable fixation space) within a telecommunications closure in which the unit 200 is mounted.

The base plate mounting portion 208 includes two legs 212 having feet 214 that are transversely offset from each other (relative to the longitudinal axis 201) for insertion into slots of a base plate to mount the unit 200 thereto. The mounting portion 208 can be adapted and locked and unlocked from a base plate in any suitable manner described herein, e.g., by including a slot-engageable portion such as a wedge adjacent one of the leg-foot components.

The body 206 defines a cable mounting region 240. At the distal end of the cable mounting region 240 there is an opening to a guide channel 248. The guide channel 248 defines a strength member routing path that lies in a plane that is not parallel to any x-z plane nor to any y-z plane. In this example, the routing path lies in an x-y plane and has a first portion 280 that runs parallel to the y-axis, and a second portion 282 in communication with the first portion 280 that runs parallel to the x-axis. In an example usage, a fibrous strength member is guided into the channel 248 from the cable mounting region 240 first via the first portion 280, then via the second portion 282 to the longitudinal channel 260.

In the example body 206, the strength member routing path defined by the channel 248 begins at the entry 250 and ends at an exit 258. The exit 258 is in communication with the longitudinal channel 260, extending longitudinally parallel to the z axis from the exit 258 in a proximal direction. The channel 260 defines a strength member routing path from the exit 258 parallel to the z axis along the side 234 of the body 206 and to a strength member anchoring region 264 positioned proximally from the channel 248. Strength member yarn can be secured with tie wraps in the strength anchoring region 264 as described above.

The second portion 282 of the guide channel 248 is distally open at the distal end 204 of the unit 200. Routing the strength member yarn through the guide channel 248 can be facilitated due to the accessibility of the second portion 282 from the distal end 204 of the fixation unit 200. In addition, securing and tightening of the strength member yarn can be aided in that the yarn is urged against the proximally facing surface 290 in addition to being urged against a distally facing surface 292 of the same guide channel 248.

The unit 200 also includes a longitudinal channel 293 on the opposite side of the unit as the longitudinal channel 260, and a lateral channel 295 on the proximal end 202 of the unit 200. The channels 248, 260, 295 and 293 form a continuous full 360 degrees guide channel arrangement about the vertical axis and around the unit 200. In example methods, prior to securing strength member yarn with tie wraps, the yarn is wrapped a full 360 degrees or more (i.e., more than one full loop around to arrive at the strength member anchoring region 264) around the unit 200 by guiding the yarn within all of the channels 248, 260, 295, and 293. In an alternative embodiment, the angled wall 294 is flattened, i.e., made parallel to the vertical axis, or removed, such that the depth of the channels 293 and 295 is the same as the depth of the channel 248, thereby further enhancing the anchoring of strength member yarn within the 360 degrees continuous channel arrangement.

From the foregoing detailed description, it will be evident that modifications and variations can be made in the devices of the disclosure without departing from the spirit or scope of the invention.

What is claimed is:

1. A cable fixation assembly, comprising:
   a body extending along a longitudinal axis between a first end and a second end and along a transverse axis between a first side and a second side, the transverse axis being perpendicular to the longitudinal axis, the body defining:
   a cable mounting region;
   a transversely extending through hole through the body;
   a longitudinally extending channel leading to the through hole; and
   a recess adjacent the through hole and positioned between the through hole and the cable mounting region;
   a cable including strength member yarn, a first portion of the yarn being positioned in the channel, a second portion of the yarn being positioned in the recess; and
   a tie passing through the through hole and securing the second portion of the yarn in the recess.

2. The assembly of claim 1, wherein the through hole is a first through hole and the recess is a first recess, and wherein the body further defines a second transversely extending through hole.

3. The assembly of claim 2, wherein the body further defines a second recess adjacent the second through hole and positioned between the second through hole and the cable mounting region.

4. The assembly of claim 1, wherein the channel is a first channel, and wherein the body further defines a second channel leading from the first side of the body to the first channel.

5. The assembly of claim 4, wherein the second channel defines an arcuate strength member routing path lying in a reference plane perpendicular to the longitudinal axis.

6. The assembly of claim 5, wherein the routing path defines an arc spanning an angle of at least 180 degrees in the reference plane.

7. The assembly of claim 5, wherein the routing path defines an arc spanning an angle of at least 270 degrees in the reference plane.

8. The assembly of claim 2, further comprising two ties feedable through the transversely extending through holes.

9. The assembly of claim 1,
   wherein the body includes a mounting portion;
   wherein the mounting portion is opposite the cable mounting region; and
   wherein the assembly further includes a slotted base plate, wherein the mounting portion includes a plurality of legs having feet extending therefrom, the legs and the feet being engageable with slots of the slotted base plate to mount the body to the base plate, the mounting portion further including a slot engagement locking member for locking the body to the base plate.

10. A method of fixing a cable, comprising:
    a) providing the cable, the cable defining a central longitudinal axis and including an optical fiber, a strength member, and an outer jacket surrounding the central axis, a portion of the optical fiber and a portion of the strength member;
    b) providing a cable fixation body extending along a longitudinal axis between a first end and a second end and along a transverse axis between a first side and a second side, the transverse axis being perpendicular to the longitudinal axis, the body defining:
    a cable mounting region;
    a transversely extending through hole through the body;
    a longitudinally extending channel leading to the through hole; and
    a recess adjacent the through hole and positioned between the through hole and the cable mounting region;
    c) feeding a tie through the through hole;
    d) holding a portion of the outer jacket to the cable mounting region;
    e) placing a first portion of an exposed length of the strength member in the channel; and
    f) looping the tie around the cable and a second portion of the exposed length of the strength member and tightening the tie such that the second portion is pulled into the recess and towards the outer jacket, the second portion extending from an end of the first portion.

11. The method of claim 10, wherein the steps c) through f) are performed in sequence.

12. The method of claim 10, wherein the channel is a first channel, wherein the body further defines a second channel leading from the first side of the body to the first channel, the method further comprising:

g) placing a third portion of the exposed length of the strength member in the second channel, wherein the step g) is performed before the step e).

13. The method of claim 10, wherein the strength member comprises strands of aramid yarn; and wherein the tie is a zip tie.

14. The cable fixation assembly of claim 4, wherein the second channel defines a strength member yarn routing path having a first portion extending parallel to the transverse axis and a second portion extending perpendicular to both the longitudinal axis and the transverse axis.

15. The cable fixation assembly of claim 14, wherein the second channel is open and accessible at the second end of the body.

16. The cable fixation assembly of claim 15, wherein the second channel is defined by a first wall facing the first end of the body and a second wall facing the second end of the body; and wherein the second channel is configured such that strength member yarn of a cable can be urged against both the first wall and the second wall when fixing the cable to the body.

17. A cable fixation assembly, comprising:

a body extending along a longitudinal axis between a first end and a second end and along a transverse axis between a first side and a second side, the transverse axis being perpendicular to the longitudinal axis, the body defining:

a cable mounting region; and a channel defining a strength member yarn routing path having a first portion at the second end of the body extending parallel to the transverse axis and a second portion extending perpendicular to both the longitudinal axis and the transverse axis, wherein the second portion is defined by a first wall facing the first end of the body and a second wall facing the second end of the body; and wherein the second portion is configured such that strength member yarn of a cable can be urged against both the first wall and the second wall when fixing the cable to the body.

18. The cable fixation assembly of claim 17, wherein the channel is open and accessible at the second end of the body.

19. A cable fixation assembly, comprising:

a body extending along a longitudinal axis between a first end and a second end and along a transverse axis between a first side and a second side, the transverse axis being perpendicular to the longitudinal axis, the body defining:

a cable mounting region;

a longitudinally extending first channel extending from the first end of the body to the second end of the body; and a second channel leading to the first channel, the second channel being open and accessible at the second end of the body, wherein the first channel and the second channel define a strength member yarn routing path.

20. The cable fixation assembly of claim 19, wherein a portion of the second channel extends parallel to the transverse axis.

21. The cable fixation assembly of claim 19, comprising a full 360 degrees channel arrangement around the body about a vertical axis defined by the body.

22. The method of claim 10, further comprising, prior to the tightening of the tie:

looping a portion of the exposed length of the strength member at least a full 360 degrees within a channel arrangement of the cable fixation body that extends continuously around the cable fixation body.

\* \* \* \* \*